United States Patent
Doernhoefer et al.

(10) Patent No.: US 12,271,968 B1
(45) Date of Patent: Apr. 8, 2025

(54) DISPUTE RESOLUTION ADMINISTRATION SYSTEM AND METHOD OF USE

(71) Applicant: ADR Notable, LLC, Columbus, OH (US)

(72) Inventors: Gary Richard Doernhoefer, Gambier, OH (US); Kimberlee Ann Klesner, Gambier, OH (US); Matthew Alan Zenko, Columbus, OH (US)

(73) Assignee: ADR Notable, LLC, Columbus, OH (US)

( * ) Notice: Subject to any disclaimer, the term of this patent is extended or adjusted under 35 U.S.C. 154(b) by 130 days.

(21) Appl. No.: 17/653,791

(22) Filed: Mar. 7, 2022

Related U.S. Application Data

(63) Continuation-in-part of application No. 29/743,077, filed on Jul. 17, 2020, now Pat. No. Des. 982,598.

(51) Int. Cl.
*G06Q 50/18* (2012.01)
*G06F 3/0481* (2022.01)
*G06F 40/174* (2020.01)
*G06F 3/048* (2013.01)

(52) U.S. Cl.
CPC ......... *G06Q 50/182* (2013.01); *G06F 3/0481* (2013.01); *G06F 40/174* (2020.01); *G06F 2203/04803* (2013.01)

(58) Field of Classification Search
CPC ... G06Q 50/182; G06F 40/174; G06F 3/0481; G06F 2203/04803
See application file for complete search history.

(56) References Cited

U.S. PATENT DOCUMENTS

| | | | | |
|---|---|---|---|---|
| 5,867,160 A * | 2/1999 | Kraft, IV | ................ | G06F 9/542 718/103 |
| 5,892,511 A * | 4/1999 | Gelsinger | ............. | G06F 3/0481 715/803 |
| 6,411,988 B1 * | 6/2002 | Tafoya | ................ | H04L 12/1813 709/248 |
| 6,539,421 B1 * | 3/2003 | Appelman | ............. | H04L 51/04 709/206 |
| 7,047,279 B1 * | 5/2006 | Beams | ................... | G06Q 10/10 709/248 |
| 7,124,164 B1 * | 10/2006 | Chemtob | ............ | H04L 65/1101 709/204 |
| 7,124,372 B2 * | 10/2006 | Brin | .................... | H04L 12/1822 715/757 |
| 7,197,638 B1 * | 3/2007 | Grawrock | ........... | G06F 21/6218 726/30 |

(Continued)

OTHER PUBLICATIONS

Alyson Carrel and Noam Ebner, Mind the Gap: Bringing Technology to the Mediation Table, 2019 J. Disp. Resol. 2:5 (2019), University of Missouri School of Law Scholarship Repository.

*Primary Examiner* — Nicholas Augustine
(74) *Attorney, Agent, or Firm* — UB Greensfelder LLP; Matthew J. Schonauer

(57) ABSTRACT

A system and methods of its use for facilitating efficient alternative dispute resolution proceedings, and particularly those embodiments wherein textual information is dynamically linked and displayed in a graphical user device or used to generate a digital agreement file. The invention discloses the use of noteboard, term sheet, case dashboard, billing and other modules to complete the process of resolving disputes and administering ADR cases.

17 Claims, 29 Drawing Sheets

(56) References Cited

U.S. PATENT DOCUMENTS

| | | | |
|---|---|---|---|
| 7,280,991 B1* | 10/2007 | Beams | G09B 7/04 706/46 |
| 7,590,941 B2* | 9/2009 | Wee | H04N 7/15 715/755 |
| 7,630,903 B1 | 12/2009 | Vaidyanathan et al. | |
| 7,725,385 B2 | 5/2010 | Royer et al. | |
| 8,484,578 B2* | 7/2013 | Gordner | G06F 3/0482 715/705 |
| 8,662,384 B2* | 3/2014 | Dodin | G06Q 20/40 235/487 |
| 9,418,356 B2* | 8/2016 | Crevier | H04L 61/4555 |
| 9,473,532 B2* | 10/2016 | Pearl | G06F 21/554 |
| 9,652,741 B2* | 5/2017 | Goldberg | G06F 16/178 |
| 9,715,534 B2* | 7/2017 | Beausoleil | G06F 3/04847 |
| 10,007,405 B2* | 6/2018 | D'Amore | G06Q 10/101 |
| 10,394,691 B1* | 8/2019 | Cole | G06F 11/079 |
| 10,600,105 B1* | 3/2020 | Kumar | G06Q 30/0637 |
| 2002/0002562 A1* | 1/2002 | Moran | G06F 16/40 707/E17.009 |
| 2002/0163548 A1* | 11/2002 | Chiu | G11B 27/28 715/864 |
| 2003/0023686 A1* | 1/2003 | Beams | G09B 5/14 709/205 |
| 2003/0025737 A1* | 2/2003 | Breinberg | G06F 8/38 715/801 |
| 2003/0028474 A1 | 2/2003 | Butler | |
| 2004/0056894 A1* | 3/2004 | Zaika | G06F 9/454 715/762 |
| 2004/0169683 A1* | 9/2004 | Chiu | G11B 27/105 715/776 |
| 2004/0201602 A1* | 10/2004 | Mody | G05B 19/409 715/700 |
| 2004/0210540 A1 | 10/2004 | Israel et al. | |
| 2005/0257160 A1* | 11/2005 | DeBellis | G06F 3/0481 715/754 |
| 2006/0190391 A1* | 8/2006 | Cullen, III | G06Q 10/10 705/37 |
| 2006/0206370 A1* | 9/2006 | Skopal | G06Q 10/06 718/102 |
| 2006/0253542 A1* | 11/2006 | McCausland | H04L 51/04 709/207 |
| 2007/0027919 A1 | 2/2007 | Mastel | |
| 2007/0078930 A1* | 4/2007 | Ludwig | H04L 12/1818 709/204 |
| 2007/0100712 A1* | 5/2007 | Kilpatrick | G06Q 10/06 705/29 |
| 2007/0156670 A1* | 7/2007 | Lim | H04L 63/205 |
| 2007/0191979 A1* | 8/2007 | Zeng | G06Q 10/02 700/97 |
| 2007/0244906 A1* | 10/2007 | Colton | G06F 40/166 |
| 2008/0098295 A1* | 4/2008 | Nelson | H04L 65/1104 715/233 |
| 2008/0120126 A1* | 5/2008 | Bone | G06Q 10/10 706/45 |
| 2008/0263629 A1* | 10/2008 | Anderson | H04L 9/3213 726/2 |
| 2009/0089625 A1* | 4/2009 | Kannappan | G06Q 10/10 714/39 |
| 2010/0070970 A1* | 3/2010 | Hu | G06F 9/45533 718/1 |
| 2010/0138756 A1* | 6/2010 | Saund | H04L 51/216 715/758 |
| 2010/0180213 A1* | 7/2010 | Karageorgos | G06F 16/93 715/764 |
| 2010/0205537 A1* | 8/2010 | Knighton | H04L 12/1831 715/751 |
| 2010/0228750 A1* | 9/2010 | Solin | G06F 16/1734 707/755 |
| 2010/0229085 A1* | 9/2010 | Nelson | G06F 40/186 715/255 |
| 2010/0235750 A1* | 9/2010 | Noland | H04L 41/22 709/221 |
| 2010/0241972 A1* | 9/2010 | Spataro | G06F 16/93 715/753 |
| 2010/0332980 A1* | 12/2010 | Sun | G06F 3/04815 715/706 |
| 2011/0167353 A1* | 7/2011 | Grosz | G06F 15/16 715/738 |
| 2011/0239129 A1* | 9/2011 | Kummerfeld | G06F 3/0488 715/750 |
| 2011/0239135 A1* | 9/2011 | Spataro | G06Q 10/10 715/753 |
| 2012/0089610 A1* | 4/2012 | Agrawal | G06F 16/20 707/741 |
| 2012/0233205 A1* | 9/2012 | McDermott | G06F 16/93 715/255 |
| 2012/0240061 A1* | 9/2012 | Hillenius | G06Q 10/06398 715/753 |
| 2012/0260195 A1* | 10/2012 | Hon | G06F 16/954 715/753 |
| 2012/0296790 A1* | 11/2012 | Robb | G06Q 40/04 715/741 |
| 2012/0331394 A1* | 12/2012 | Trombley-Shapiro | H04L 67/06 715/748 |
| 2013/0019028 A1* | 1/2013 | Myers | G06F 40/197 709/246 |
| 2013/0080919 A1* | 3/2013 | Kiang | H04L 67/63 715/753 |
| 2014/0082071 A1* | 3/2014 | Rexer | G06F 16/192 709/204 |
| 2014/0310243 A1* | 10/2014 | McGee | G06F 16/27 707/639 |
| 2015/0310188 A1* | 10/2015 | Ford | H04L 63/101 726/28 |
| 2016/0203571 A1 | 7/2016 | Beshah | |
| 2016/0378735 A1* | 12/2016 | Mullins | G06T 11/206 715/212 |
| 2017/0270022 A1* | 9/2017 | Moresmau | G06F 11/302 |
| 2018/0089561 A1* | 3/2018 | Oliner | G06F 16/2471 |
| 2019/0034395 A1* | 1/2019 | Curry | G06F 40/166 |
| 2019/0207969 A1* | 7/2019 | Brown | G06F 21/552 |
| 2019/0303349 A1* | 10/2019 | Burshteyn | H04L 9/0891 |
| 2020/0104518 A1* | 4/2020 | Parker | G06F 21/6209 |
| 2020/0125796 A1* | 4/2020 | Pirhonen | G06F 40/186 |
| 2020/0193263 A1* | 6/2020 | Pham | G06Q 10/103 |
| 2020/0204608 A1* | 6/2020 | Kisin | G06F 40/197 |
| 2020/0335064 A1* | 10/2020 | Greco | G06F 3/0485 |
| 2020/0389313 A1* | 12/2020 | Singh | H04L 9/0637 |
| 2022/0122087 A1* | 4/2022 | Gosset | G06Q 20/027 |

* cited by examiner

| Issue | Proposal | Fact | Uncategorized |
|---|---|---|---|
| ABC ABC is trying to stifle competition with litigation | Stipulated dismissal of all claims | ABC EE took sensitive documents from ABC and disclosed to XYZ | SS XYZ will refuse to scrap project completely |
| ABC XYZ has a jump on developing a competetive project<br><br>[FACTS] ABC EE employed by XYZ during noncompete period<br><br>[FACTS] XYZ EE's role at XYZ is outside scope of noncompete roles | ABC XYZ and EE certify destruction of all documents with liquidated damages clause for breach<br>[UNCAT...] ABC wants protection from XYZ or EE failure to destroy documents. | ABC EE's role at XYZ is outside the scope of complete roles | ABC wants protection from XYZ for EE failure to destroy documents |
| | ~~ABC XYZ no longer employs EE.~~ | ABC EE employed by XYZ during noncomplete period. | ABC xxxxxxx xxx xxxx xxxxx xxxxx xxxxx |
| | XYZ XYZ is responsible for payment of $40,000 to ABC<br>520<br>522<br>[UNCAT...] ABC xxxxxxx xxx xxx xxxx xxxxx xxxxxx xxx xxx xxxx xxxxx | 516<br>502 | EE just wants to work |
| | ABC XYZ delays new product launch by nine months from settlement | | |

Add a Counter Proposal for XYZ and EE are jointly and severally responsible for payment to ABC — 602

Counter Proposal

XYZ is responsible for payment of $50,000 to ABC — 604

Party Attribution — 606

- ⦿ ABC James
- ○ TT Thomas
- ○ XYZ Barbara
- ○ SS Samantha
- ○ EE Edward

Add — 608

Cancel

Proposal

Stipulat

ABC dest dam

UNCA failu

ABC XYZ

XYZ XYZ Paymen
UNCAT...

ABC laun

☐ ABC v. XYZ et al.                    ⚲ ▽ View options | ⊘ View time log | Plenary: 00:00:00 ⊙ ⊚ | Caucus: 00:00:00 ⊙ ⊡ Checklists | Help Enter note (i.e. #fact @is split savings 50/50)

★ Jimmy (@ABC)  Tomm (TT)  ★ Barb (@XYZ)  #Issues  #Proposals  #Facts  #Uncategorized  Sam (SS)  ★ Ed (@EE)  [C][M] Lock  Add

| Issue | Proposal | Fact 904 | Uncategorized |
|---|---|---|---|
| XYZ ABC is trying to stifle competition with litigation | Stipulated dismissal of all claims 916 | ⊡ ABC EE took sensitive documents from ABC and disclosed to XYZ | SS XYZ will refuse to scrap the project completely |
| ABC XYZ has a jump on developing a competitive product | ABC XYZ and EE certify destruction of all documents with liquidated damages clause for breach. | XYZ EE's role at XYZ is outside scope of noncompete roles | ⊡ ABC wants protection from XYZ or EE failure to destroy documents. |
| FACTS ABC EE employed by XYZ during noncompete period. | UNCAT... ABC wants protection from XYZ or EE failure to destroy documents. | ABC EE employed by XYZ during noncompete period. | ⊡ ABC |
| FACTS XYZ EE's role at XYZ is outside scope of noncompete roles 906 | FACTS ABC EE took sensitive documents from ABC and disclosed to XYZ | | EE just wants to work |
| | ~~ABC XYZ no longer employs EE.~~ | | |
| | XYZ XYZ is responsible for payment of $40,000 to ✓ ABC | | |
| | UNCAT... ABC | | |
| | ABC XYZ delays new product launch by nine ✓ moths from settlement. | | |

908

916

902 ← 104

ADR Notable

- Dashboard
- Cases
  - Case Dashboard
  - Documents
  - Noteboard
  - Term Sheet
  - Timelog
  - Case Billing
    - Billables
    - Invoices
    - Accounts
  - Activity History
  - Secure Delete
- Billing
- Calender
- Library
- Professionals Database Below Deck Yachting, LLC v. Yacht Fuel, LLC - Invoice Search  Create Invoice  Help

1606

| Status | Invoice# | Due Date | Billed To | Total | Payments | Balance | Actions |
|---|---|---|---|---|---|---|---|
| Fully Paid | 01-001 | 02/25/2022 (Overdue) | Below Deck Yachting, LLC | $32.50 | $32.50 | $0.00 | Actions ˅ |
| Fully Paid | 01-002 | 02/25/2022 (Overdue) | Yacht Fuel, LLC | $16.25 | $16.25 | $0.00 | Actions ˅ |
| Outstanding | 02-003 | 02/26/2022 (Overdue) | Below Deck Yachting, LLC | $10.00 | $0.00 | $10.00 | Actions ˅ |
| Outstanding | 02-004 | 02/26/2022 (Overdue) | Yacht Fuel, LLC | $10.00 | $0.00 | $10.00 | Actions ˅ |
| Outstanding | 03-005 | 02/26/2022 (Overdue) | Below Deck Yachting, LLC | $10.00 | $0.00 | $10.00 | Actions ˅ |
| Outstanding | 03-006 | 02/26/2022 (Overdue) | Yacht Fuel, LLC | $10.00 | $0.00 | $10.00 | Actions ˅ |
| Outstanding | 04-007 | 03/30/2022 | Below Deck Yachting, LLC | $250.00 | $0.00 | $250.00 | Actions ˅ |
| Outstanding | 04-008 | 03/30/2022 | Yacht Fuel, LLC | $250.00 | $0.00 | $250.00 | Actions ˅ |
| Outstanding | 05-009 | 03/30/2022 | Below Deck Yachting, LLC | $1,000.00 | $0.00 | $1,000.00 | Actions ˅ |
| Outstanding | 05-010 | 03/30/2022 | Yacht Fuel, LLC | $1,000.00 | $0.00 | $1,000.00 | Actions ˅ |

1-10 of 10  < 1 >  20 / page ˅

DISPUTE RESOLUTION ADMINISTRATION SYSTEM AND METHOD OF USE

CROSS-REFERENCE TO RELATED APPLICATIONS

This application claims the benefit of U.S. application Ser. No. 29/743,077 filed 17 Jul. 2020, the content of which is hereby incorporated by reference as if fully recited herein.

BACKGROUND OF THE INVENTION

Exemplary embodiments of the present invention relate generally to computer systems and methods of use and more specifically to systems and methods for administering dispute resolution proceedings.

The following description of the background of the invention is provided simply as an aid in understanding the invention and is not admitted to describe or constitute prior art to the invention.

The human mind is known to be quite adept at carrying out complex tasks quickly. In formal dispute resolution undertakings, for example, neutral mediators are often employed to broker agreements between two or more parties, where the dispute resolution activities often involve many versions of complex facts, proposals to resolve the dispute, legal and practical issues, and many other logistical difficulties. Mediation sessions are often conducted in-person, or at least remotely in real time, and require tact, confidentiality, and a neutral mediator that can understand complex dispute factual and legal issues.

Dispute resolution activities are common in many areas of our modern society, for example in connection with litigation proceedings, through contractual obligations between parties, and within commercial organizations handling internal disputes. Regardless of the forum, setting or other particular circumstances involved in dispute resolution, guiding the dispute resolution process has become a complex undertaking. This is particularly true when considering the vast impact that the ongoing pandemic has had on the global economy and the resulting increase in digital interaction in our daily lives. For instance, an attempt to mediate a dispute during pending litigation may involve a large amount of digital correspondence in the form of correspondence, evidentiary support, scheduling, and settlement agreement negotiations and drafting. Furthermore, there exists an ever increasing need to manage digital assets and information securely, such as billing and time tracking information, party information, document storage for agreement drafts, negotiation notes and the like. While there may exist piecemeal solutions to these various discrete needs, there is no known solution in the dispute resolution industry that provides a wholesale, integrated digital solution to the problems inherent in the process.

The inherent nature of any formalized dispute resolution process necessitates some form of documentation in order to advance the dispute toward a resolution agreeable to all parties involved. During negotiations at a mediation, for example, there is often a need to document information germane to the process, such as important facts, issues, proposals, and the parties that introduced them. These types of activities can be carried out manually on notepads, or digitally with computing devices.

Manual forms of notetaking during dispute resolution administration have long been the preferred method, established well before the advent of personal and portable computing. Even after the rise of such devices and capabilities, however, manual documentation of dispute resolution processes continues to be favored by a large portion of the applicable population. One reason for this is thought to be the ease by which manual documentation may be employed to visualize links between important pieces of information learned during the negotiation. In general, visualization components used in the aid of complex problem solving is seen as helpful to human endeavors. Therefore, simple tools such as paper and pencil have been favored by mediators, for instance, when attempting to evaluate a dispute and assist in the formulation of settlement agreements.

While manual forms of documenting the dispute resolution process have obvious advantages, there are likewise many disadvantages as well. For example, manual notetaking is not easily trackable or organizable, particularly once ideas and information are committed to paper by the documenter. Digital record storage advantages, such as edit histories, edits and organization changes are simply not available using this method. It is also difficult to share manually taken notes and other information, particularly in situations in which the information needs to be shared to multiple parties. There are also occasions in which manual notetaking lacks a sufficient level of confidentiality, creating unwanted scenarios in which confidential information could be unintentionally shared during caucus sessions.

The rise of personal and portable computing devices has allowed such devices and their advantages to be available to those that participate in real time dispute resolution proceedings. While the use of digital notetaking has advantages over manual notetaking in this context, it also comes with its own set of disadvantages that have not been overcome in the art. For example, mediators may use a laptop and word processing capabilities to document the dispute resolution process. This can increase the amount of information that can be gathered, permits for easier sharing of that information via electronic communication and copy/paste functionality, and greatly reduces the burden of editing or changing information collected during the process when compared to manual notetaking. However, the known forms of digital notetaking continue to suffer from several disadvantages, such as a severely reduced or nonexistent visual ordering capability for operations such as fact and issue linking, proposal attribution and the like. In many cases, digital solutions currently available in the field also fail to provide for intuitive and helpful organization, tracking and editing of negotiation elements and notes.

While both manual and digital documentation tools known in the dispute resolution field carry in some cases opposing advantages and disadvantages, all presently known solutions fail to provide the improved, advantageous features taught by way of the present invention, including features such as automated proposal and consensus building, detailed process tracking, and privacy, confidentiality, and security features.

Alternative dispute resolution professionals often are involved with charging the various case participants for services and expenses incurred in association with the administration of the case. In circumstances under which direct billing to case participants is not needed, there still may exist a need for time tracking and apportionment of costs, for example in the context of court-mandated mediation proceedings. In any event, the current state of the art in the ADR administration field is not thought to provide satisfactory solutions to the problem of service and expense apportionment and billing. In many cases, invoicing activities are carried out with generic third-party systems if software is used at all, and there are no known solutions that provide the administrator the ability to easily apportion services and expenses amongst the case participants based on custom rule sets. It is common in ADR proceedings for the parties to privately agree to a particular sharing of the proceeding costs, for example, and tracking and complying with those private agreements can be difficult, cumbersome and in many cases is an impossible task.

It is therefore an unmet need in the prior art for a dispute resolution tracking system and associated methods for conducting dispute resolution sessions that presents strong visual information organization and linking and automated agreement building with robust privacy, confidentiality, security and invoicing features. No known references, taken alone or in combination, are seen as teaching or suggesting the presently claimed invention.

BRIEF SUMMARY OF THE INVENTION

Exemplary embodiments of the present disclosure pertain to computer-implemented methods for dynamically linking textual information displayed in a graphical user interface by displaying a first swim lane containing a first notecard in a first state comprising first textual information, displaying a second swim lane containing a second notecard comprising second textual information, constantly monitoring the boundaries of the first notecard and the second notecard to detect an overlap condition where the second notecard overlaps the first notecard, automatically linking the second notecard in a child relationship with the first notecard, automatically displaying the first notecard in a second state, wherein the first textual information is displayed in a primary content area and the second textual information of the second notecard is displayed in a nested content area, receiving an edit to the second textual information of the second notecard wherein the second notecard comprises edited textual information, and automatically displaying the first notecard in a third state, wherein the first textual information is displayed in the primary content area of the first notecard and the edited textual information is displayed in the nested content area.

An object of the present invention is to provide methods wherein the first notecard further comprises a proposal acceptance button and a counterproposal button, and the method further comprises the steps of receiving an actuation signal via the proposal acceptance button of the first notecard and generating a digital agreement file comprising the first textual information.

An object of the present invention is to provide exemplary methods wherein the step of generating a digital agreement file comprises the steps of displaying on the graphical user interface a term sheet module comprising an agreements clause component having an editable agreements text box, populating the editable agreements text box with the first textual information and generating a digital agreement file comprising the first textual information.

In some exemplary embodiments of the present invention, methods are provided in which the step of generating a digital agreement file includes the steps of displaying on the graphical user interface a term sheet module having a preamble clause component having an editable preamble text box and an insert preamble clause button, and an agreements clause component having an editable agreements text box. Exemplary methods are further provided wherein the steps include populating the editable agreements text box with the first textual information, populating the editable preamble text box with a first preamble clause selected from a preamble clause library via the insert preamble clause button, and generating a digital agreement file having the first preamble clause and the first textual information.

It is an object of the present invention to provide further methods wherein the step of generating a digital agreement file includes displaying on the graphical user interface a term sheet module having a preamble clause component having an editable preamble text box and an insert preamble clause button, an agreements clause component having an editable agreements text box, and a standard terms component having an editable standard terms text box and an insert standard terms button. In some exemplary embodiments the method includes populating the editable agreements text box with the first textual information, populating the editable preamble text box with a first preamble clause selected from a preamble clause library via the insert preamble clause button, populating the editable standard terms text box with a first standard terms clause selected from a standard terms clause library via the insert standard terms button, and generating a digital agreement file having the first preamble clause, the first textual information and the first standard terms clause.

In some exemplary embodiments, the first notecard further includes a proposal acceptance button and a counterproposal button, and a method is provided that includes the steps of receiving an actuation signal via the counterproposal button, displaying on the graphical user interface a counterproposal entry overlay form having a counterproposal text entry field and an add button, receiving a counterproposal text information in the text entry field, receiving an actuation signal via the add button of the counterproposal entry overlay form, removing the counterproposal entry overlay form from the graphical user interface, automatically displaying the first notecard in a fourth state, wherein the counterproposal text information is displayed in the primary content area of the first notecard and the edited textual information is displayed in the nested content area, receiving an actuation signal via the proposal acceptance button of the first notecard, and generating a digital agreement file comprising the first textual information.

An object of the present invention is also to provide further computer-implemented methods for dynamically linking textual information displayed in a graphical user interface to facilitate the resolution of a dispute between at least two parties, including steps for displaying a proposal swim lane containing a first notecard in a first state, wherein the first notecard includes first textual information, a proposal acceptance button, and a counterproposal button, displaying a secondary swim lane containing a second notecard comprising second textual information, constantly monitoring the boundaries of the first notecard and the second notecard to detect an overlap condition where the second notecard overlaps the first notecard, automatically linking the second notecard in a child relationship with the first notecard, automatically displaying the first notecard in a second state, wherein the first textual information is displayed in a primary content area and the second textual information of the second notecard is displayed in a nested content area, receiving an edit to the second textual information of the second notecard wherein the second notecard comprises edited textual information, and automatically displaying the first notecard in a third state, wherein the first textual information is displayed in the primary content area of the first notecard and the edited textual information is displayed in the nested content area.

In some exemplary embodiments, a computer-implemented method is provided for dynamically linking textual information displayed in a graphical user interface, including the steps for displaying a noteboard module on the graphical user interface, wherein the noteboard module includes a notetaking entry component having a note input field portion and a notecard type flag portion, and a notecard display component, displaying in the notecard display component a proposal swim lane and a secondary swim lane, receiving a first input including a first textual information received in the note input field portion and a first notecard type flag in the notecard type flag portion, wherein the first notecard type flag is associated with the proposal swim lane, receiving a second input including a second textual information received in the note input field portion and a second notecard type flag in the notecard type flag portion, wherein the second notecard type flag is associated with the secondary swim lane, displaying in the proposal swim lane a first notecard in a first state comprising the first textual information, displaying in the secondary swim lane a second notecard in a first state comprising the second textual information, constantly monitoring the boundaries of the first notecard and the second notecard to detect an overlap condition where the second notecard overlaps the first notecard, automatically linking the second notecard in a child relationship with the first notecard, automatically displaying the first notecard in a second state, wherein the first textual information is displayed in a primary content area and the second textual information of the second notecard is displayed in a nested content area, receiving an edit to the second textual information of the second notecard wherein the second notecard comprises edited textual information, and automatically displaying the first notecard in a third state, wherein the first textual information is displayed in the primary content area of the first notecard and the edited textual information is displayed in the nested content area.

Exemplary embodiments of the present disclosure pertain to dispute resolution administration systems. In some exemplary embodiments the system is provided with a primary database, a secure delete database and a web server. The primary database is backed up to long-term backups, whereas the secure delete database is configured with a short-term backup process. The web server communicates with the primary database and secure delete database to provide information related to dispute resolution cases to a user device.

An object of the present invention is to provide method of visual notetaking and organization via the use of a noteboard with moveable notecards, and swim lanes.

It is an object of this invention to provide a dispute resolution administration platform of the type generally described herein, being adapted for the purposes set forth herein, and overcoming disadvantages found in the prior art. These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 5 is a schematic view of an exemplary notecard display component;
FIG. 6 is a schematic view of an exemplary counterproposal input form;
FIG. 9A is a schematic view of an exemplary noteboard module displayed on a user device illustrating dynamic notecard linking;
FIG. 9C is a schematic view of an exemplary noteboard module displayed on a user device illustrating dynamic notecard linking;
FIG. 16 is a schematic view of an exemplary billing module displayed on a user device.

DETAILED DESCRIPTION OF THE INVENTION

Figure 1:
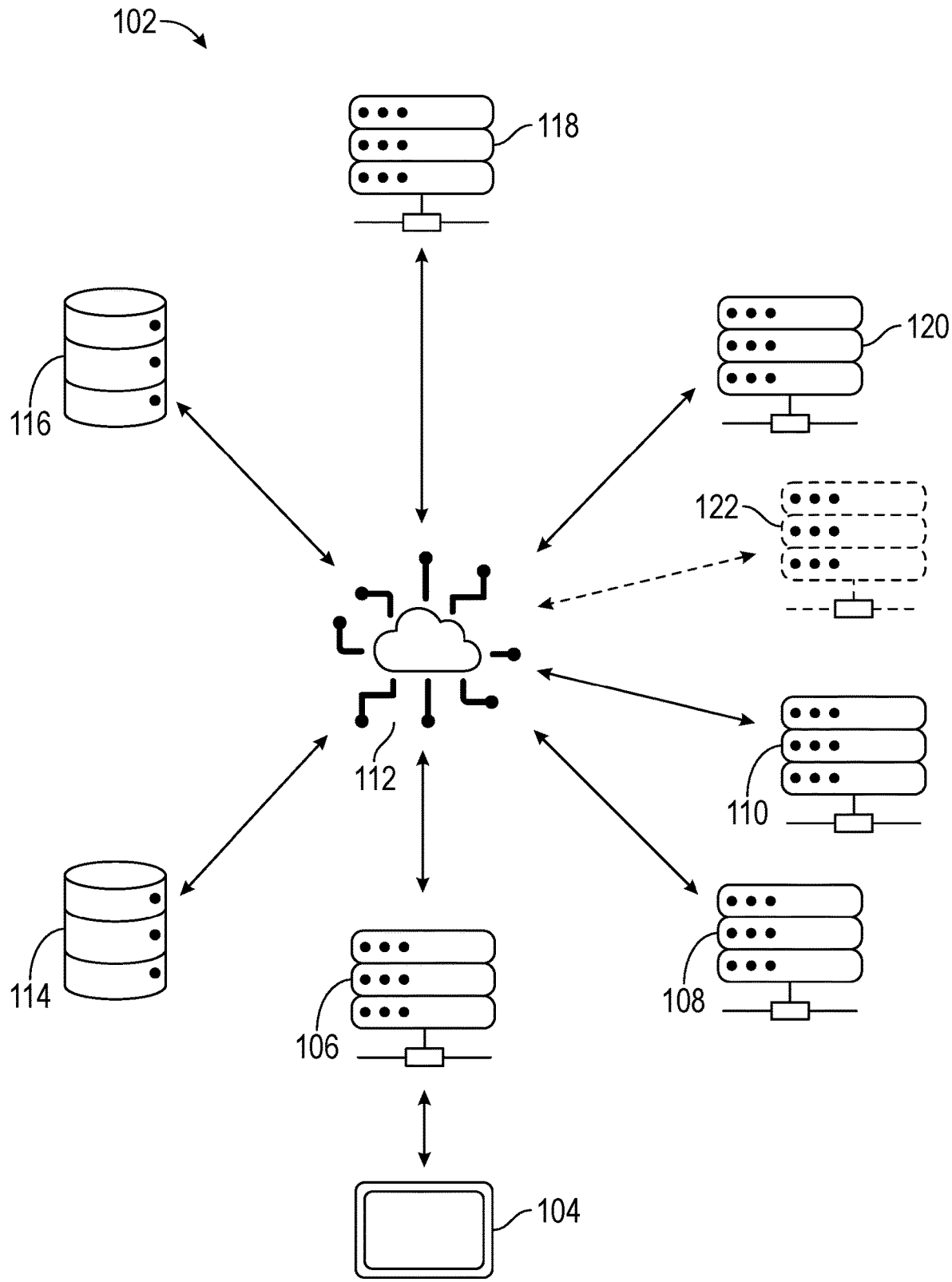
FIG. 1 is a schematic diagram of an exemplary embodiment of a dispute resolution system.

Exemplary embodiments of the present invention are directed to systems for administering dispute resolution services and methods associated therewith.

Before beginning the discussion of the various aspects of the illustrative embodiments in more detail, it should first be appreciated that throughout this description the terms "mechanism" or "module" will be used to refer to elements of the present invention that perform various operations, functions, and the like. A "mechanism" or "module," as the terms are used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism" or "module." Thus, the mechanisms and modules described herein may be implemented as specialized hardware, software executing on general purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms or phrases are not intended to limit the description or claims to a single feature or element being present or require that a plurality of such features or elements be present. To the contrary, these terms and phrases only require at least a single feature or element with the possibility of a plurality of such features or elements being within the scope of the description and claims.

Moreover, it should be appreciated that the use of the term "engine," if used herein with regard to describing embodiments and features of the invention, is not intended to be limiting of any particular implementation for accomplishing or performing the actions, steps, processes, etc., attributable to or performed by the engine. An engine may be, but is not limited to, software, hardware, firmware or any combination thereof that performs the specified functions including, but not limited to, any use of a general or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network may comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions may also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

Turning first to FIG. 1, a schematic diagram of an illustrative embodiment of a system 102 for administering dispute resolution proceedings is depicted. In some embodiments, the system is accessed and used via one or more user devices 104. In a preferred embodiment the system is accessible via a web server 106 through a modern internet browser application on the user device 104. Those skilled in the art will appreciate that the user device 104 can therefore be embodied in a variety of forms that generally permit standards-compliant access to web services, including but not limited to smart phones, tablets, desktop computers, laptop computers and the like. In some embodiments, the web server 106 may be configured to interact with the user device 104 via a specific downloadable application to be installed on or run by the user device 104. In general, the system is generally a centralized system with network-accessible components as will be described in further detail herein.

In some embodiments the web server 106 communicates with an application programming interface (an "API") server 108 and an authentication server 110. Each of these servers 106, 108 and 110 are described with regard to their function, although it should be noted that they may be provided as discrete and physically separate components of an illustrative embodiment of the invented system, or alternatively may be provided as logical components of a singular computer system. Similarly, the servers may communicate within the same computer structure, via a local area network or over wide area or public networks 112.

In a preferred embodiment, the platform 102 is implemented as an ASP.NET Core web app, wherein the web server 106 is embodied as a React single page application (a React "SPA") accessible on user devices 104 via public networks 112. The API server 108 is provided in a preferred embodiment with Microsoft Web API and authentication is provided through an authentication server 110.

Data associated with use of the platform 102 is stored in one or more databases, such as 114 and 116. In a preferred embodiment, at least two databases are utilized, a primary database 114 and a document database 116. As described in further detail herein, the isolation of document data on the platform 102 is considered desirable in order to provide for secure delete functionality of sensitive and highly confidential documents that may be stored on the platform during regular use. In a preferred embodiment the databases deployed are Microsoft SQL Server databases.

The dispute resolution administration platform 102 was invented in part to reduce the difficulty in administering many active dispute resolution cases. Many dispute resolution professionals, such as judicially employed or private mediators, or corporate dispute resolution officers for instance, handle large caseloads consisting of many active and closed cases. One of the goals of the invented platform 102 was thus to provide the dispute resolution professional with a centralized case management tool to comprehensively track case metrics and logistical items. Therefore, in some embodiments the primary database 114 is configured to uniformly store general information related to each case, the primary parties involved in the case as well as other persons attending dispute resolution proceedings or representing those primary parties, contact information, billing information, time tracking information, scheduling information, form template information, communication information, activity log information and the like.

In some embodiments an optional separate document database 116 is configured to store case-specific documents that may be provided by the participants to a dispute resolution proceeding or created during negotiations. The separation of document storage in this manner is provided in deployments wherein quick and secure deletion functionality is desired. Examples of sensitive and confidential documentation that may be provided or developed during administering a case include background documents provided by the parties, position summaries or mediation statements, prior settlement offers, dispute resolution notes taken by the neutral, settlement agreement drafts, and the like. The secure document database 116 is configured with a shortened backup retention policy such that a request to secure delete all case-related data within the database 116 will be purged entirely from the live database itself as well as any backups.

In some embodiments, optional connectivity and integrations are provided with third party services to permit greater operability and convenience from the perspective of the user. In some embodiments these integrations are performed by communicating with web-facing services such as calendaring services via one or more calendaring servers 118, document storage and filing sharing services via one or more file servers 120, and other desirable services such as payment processing services via one or more integrated services servers, generally, at 122.

Figure 2A:
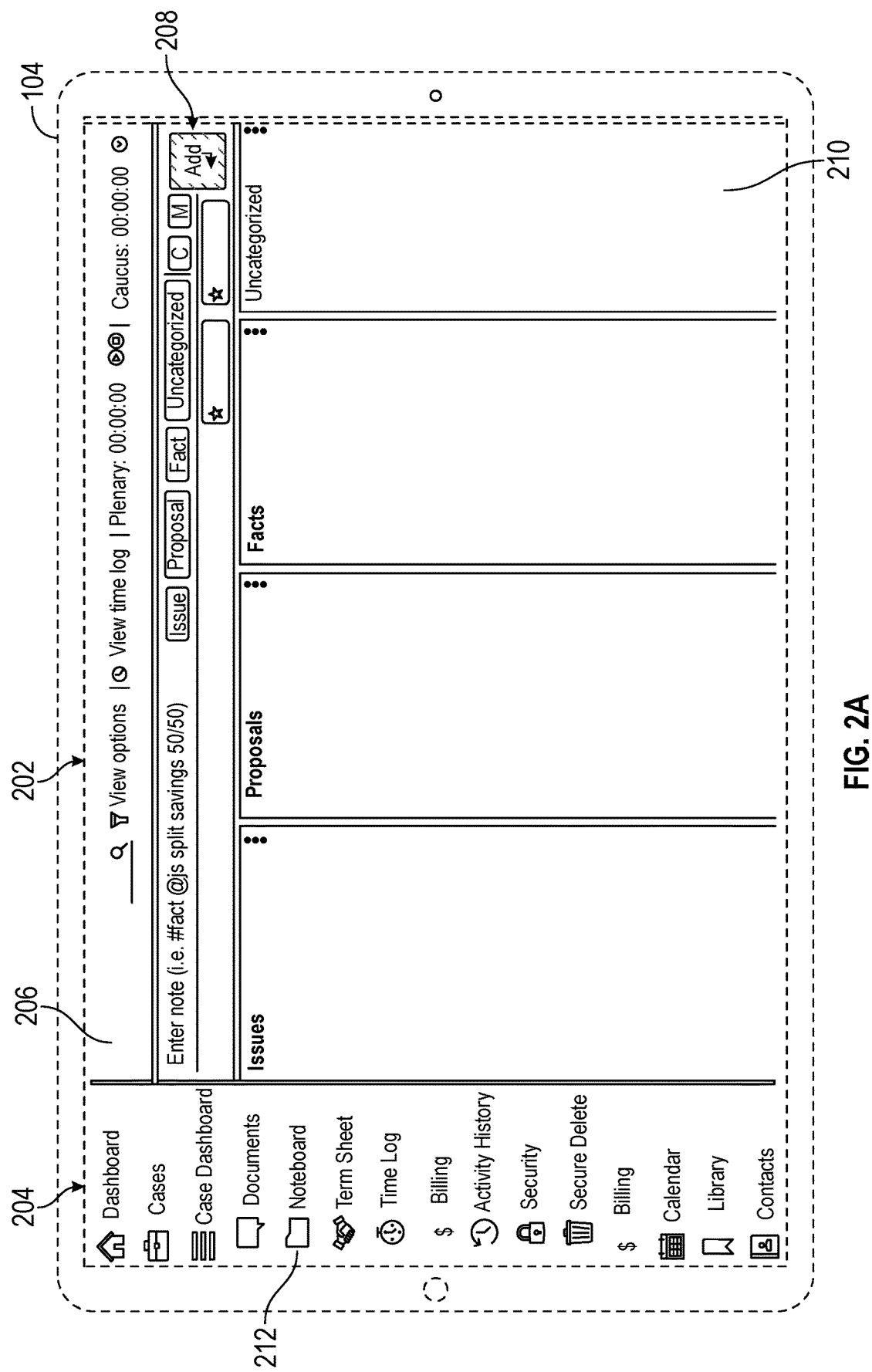
FIG. 2A is a schematic view of an exemplary noteboard module displayed on a user device.

Turning to FIGS. 2A-2E, an exemplary embodiment of a graphical display 202 depicted on the display portion of a user device 104 is illustrated. In particular, the graphical display 202 depicted in FIG. 2A represents an exemplary version of the noteboard module of the platform that is used for in-session notetaking and consensus building in a dispute resolution case. An exemplary embodiment of the noteboard module will display four main graphical components on a user device 104: (1) a navigation menu 204 (optionally and preferably collapsible in nature); (2) a utilities component 206; (3) a notetaking entry component 208; and (4) a notecard display component 210. In exemplary embodiments, the "Noteboard" menu option 212 will navigate a user to the noteboard module display shown in connection with FIG. 2A.

Figure 2B:
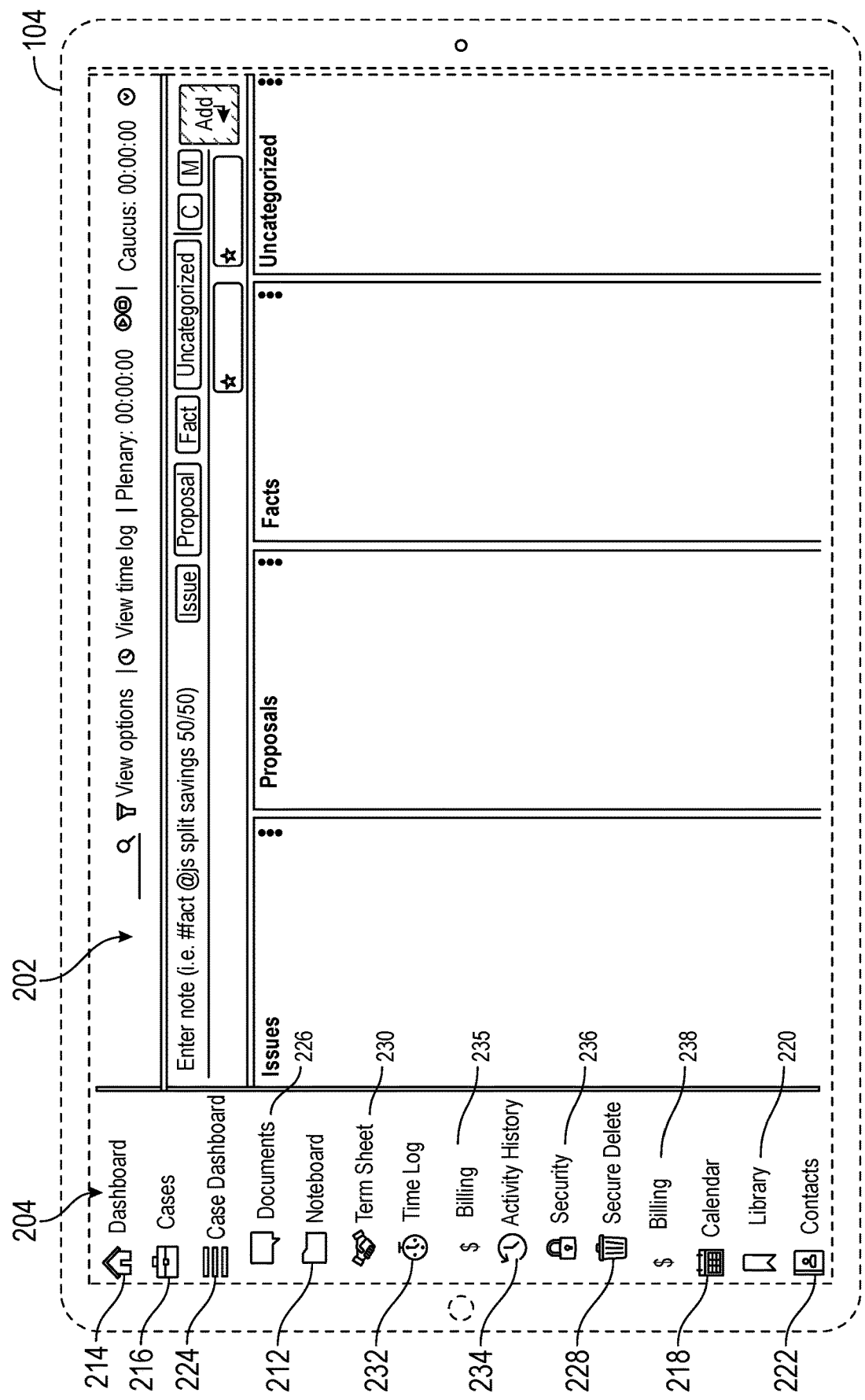
FIG. 2B is a schematic view of an exemplary noteboard module displayed on a user device.

Turning to FIG. 2B for further clarity, an exemplary navigation menu component 204 of the noteboard module graphical display 202 includes first level menu options such as Dashboard 214, Cases 216, Billing 238, Calendar 218, Library 220 and Contacts 222. These options are related to platform functionality that is not case-specific, such as user profile and permissions, calendaring, case settings, document templating and contact information storage. The Cases option 216 may carry a second level navigation menu with options specific to a particular case for that user. For example, the Case Dashboard 224 option may link to a dashboard with access to case-specific information, such as party identity data, attendee data, billing data, case identification data and the like. The Documents option 226 may be provided to link to the secure and confidential document storage for documents associated with a particular case. In some embodiments, these documents are stored in a separate secure document database (see 116 in connection with FIG. 1) for quick, secure and permanent deletion of sensitive documents. If such a feature is desired, the navigation menu component 204 may include a convenient Secure Delete menu option 228 to assist users in undertaking the secure delete operation.

Another preferred feature of the dispute resolution administration platform is linked via the Term Sheet menu option 230. As will be explained in further detail below, the dispute resolution administration platform includes a guided negotiated settlement agreement builder module to strengthen consensus building and dynamically construct principal agreement terms or fully executed settlement agreements during dispute resolution sessions. The Term Sheet menu option 230 provides navigation to this module.

In some exemplary embodiments the dispute resolution administration platform is further provided with timekeeping functionality accessible via the Time Log menu option 232. The timekeeping functionality in preferred embodiments is integrated with a billing module that is accessible via the Billing menu option 235. The case-level billing menu option 235 directs a user to billing functionality within a specific case. The top-level billing menu option 238 provides for firm-wide billing functionality, such as invoicing across all cases.

Case-specific activity history for user activity in the platform is optionally provided via the Activity History menu option 234. Finally, some exemplary embodiments of the system may be provided with direct navigation to the permissions of various users of the system via the Security menu option 236. For example, a court-appointed mediator may wish for administrative staff or junior mediators to have access to the platform to perform ministerial tasks, participate in the dispute resolution proceedings or larger firms may desire to track a plurality of dispute resolution professionals with their services being administered through the platform. Granular case-level security permissions are thus preferably provided in optional embodiments in order to maintain security and confidence with respect to the information associated with each case.

Figure 2C:
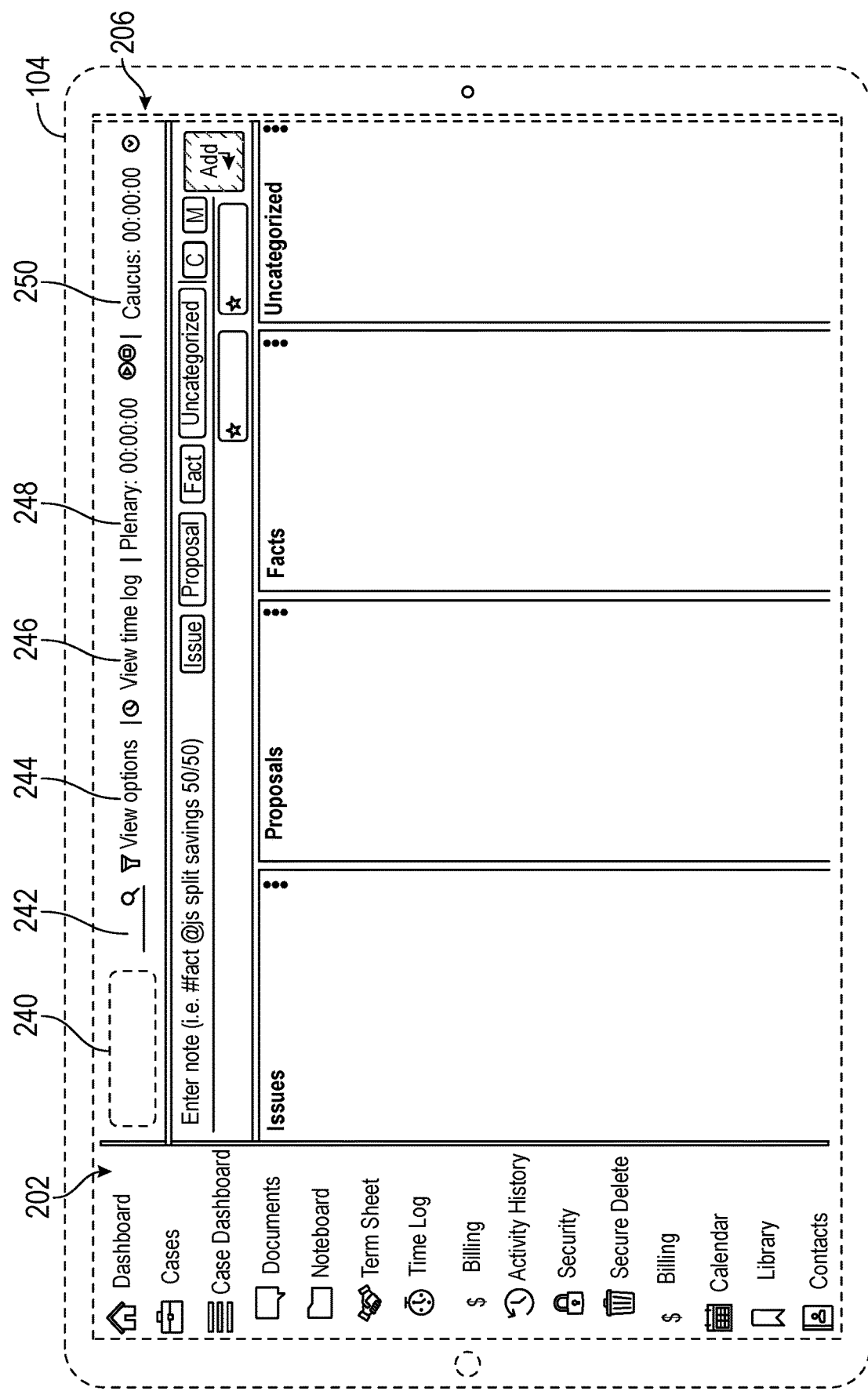
FIG. 2C is a schematic view of an exemplary noteboard module displayed on a user device.

An exemplary embodiment of the utility component 206 of the noteboard module graphical display 202 is presented in connection with FIG. 2C. The utility component 206 is generally provided with functionality that is complimentary to the notetaking features of the module and those that are useful to the dispute resolution professional during sessions with the parties. For example, the title of the case, case number, or other such case identifying information may be displayed in the case name portion 240 of the component. A search functionality may also be provided in a search portion 242 of the component. In some preferred embodiments the search feature is used to visually emphasize notecards that match the search terms entered into this portion. This can be accomplished by dimming unmatched notecards (i.e., those with no matches to the search terms entered), highlighting the matched notecards (i.e., those with matches to the search terms entered), or a combination thereof. Other similarly useful viewing option functionality may further be provided in a view options portion 244 as will be described in more detail below. In some cases, the view options portion 244 may be provided with dropdown or expanded viewing.

In some embodiments the utility component is also provided with a link to the time log in a time log portion 246. This option may shift the display to the timekeeping module on a separate display, such as that provided by menu navigation link (see 232 in connection with FIG. 2B). Functional timekeeping timers for plenary session 248 and caucus sessions 250 are provided particularly in connection with mediation uses of the platform. These portions 248 and 250 of the utility component 206 may be actuated by the user of the platform to readily track time spent in dispute resolution proceedings for billing purposes, to track metrics for making observations and improvements to dispute resolution outcomes, and other such desirable uses.

Figure 2D:
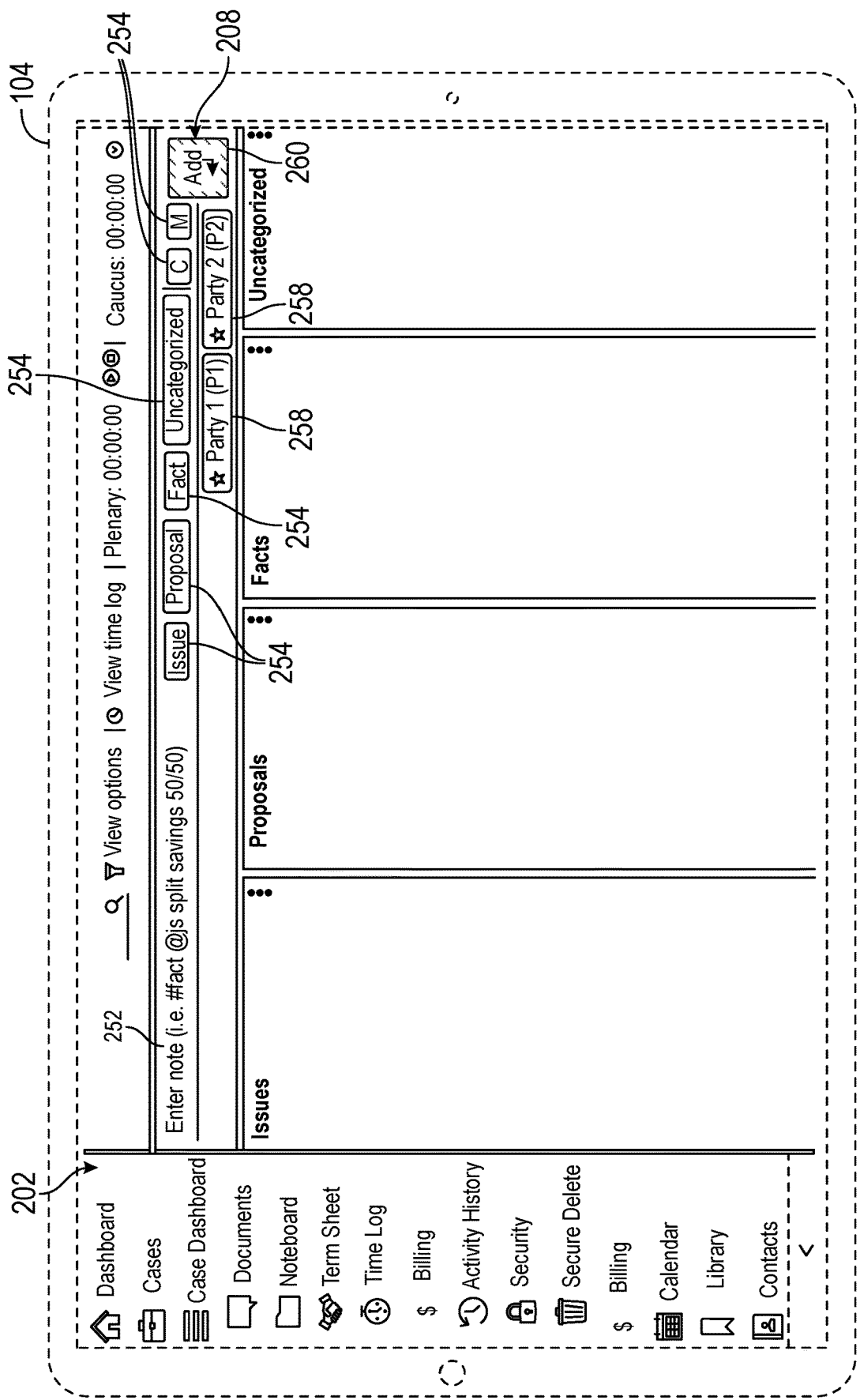
FIG. 2D is a schematic view of an exemplary noteboard module displayed on a user device.

Turning to FIG. 2D the notetaking entry component 208 is further described. The primary action portion of the notetaking entry component 208 is a note input field portion 252. The note input field portion 252 of the component 208 accepts input from a user through the user device 104. The input can be typed with a physical or touchscreen keyboard device, translated from speech to text by a dictation module or inherent device functionality, can be pasted into the field, or any other similar or like methods of entering note information. The entry of each note into the note input field 252 result in the creation and storage of a notecard carrying the textual data input therein. While data types other than textual data may be implemented on a given iteration of the platform, such as sound data, video data or other digital file data, it is preferred for standard dispute resolution proceedings to utilize textual information for forming notecards. Each note may optionally carry up to three or more types of categorization flags. In a preferred embodiment, a first categorization flag is a notecard type flag 254. In an exemplary embodiment, the notecard type flags 254 allow a user to designate a note as an issue, a proposal, a fact, or an uncategorized note. The default with no user indication may be uncategorized. As will be explained in further detail herein below, the notecard type flags are used to distribute and track notes into the appropriate swim lanes in the notecard display component (see 210 in connection with FIG. 2A).

In a preferred embodiment, a second categorization flag is a note context flag 256. A note context flag 256 may be set to indicate the context in which the information contained in the note was received or entered. For example, two common note context flags 256 are depicted in connection with FIG. 2D with the letters "C" and "M." These context flags are used to designate caucus notes and mediator notes. A caucus note is a note taken during a caucus session. By default, the noteboard module will visually blur the notecard to obscure its contents and indicate that they are confidential. A mediator note is useful when the user wishes to capture their own thought, jot down a follow-up question, or create a reminder for later use. Mediator notes can also be visually blurred or otherwise obscured by default when displayed on the noteboard module as well.

Finally, a third categorization flag that may be provided for use is a note attribution flag 258. Note attribution flags 258 allow the user to attribute the contents of a note to a particular individual or party involved in the dispute resolution proceeding. This type of flag is used in preferred embodiments to easily track the source of information noted during dispute resolution sessions and to filter information by source. Upon the entry of the note and the user's selection of categorization flags, if any, the "Add" button 260 is actuated and a notecard entry is created in the platform database.

Figure 2E:
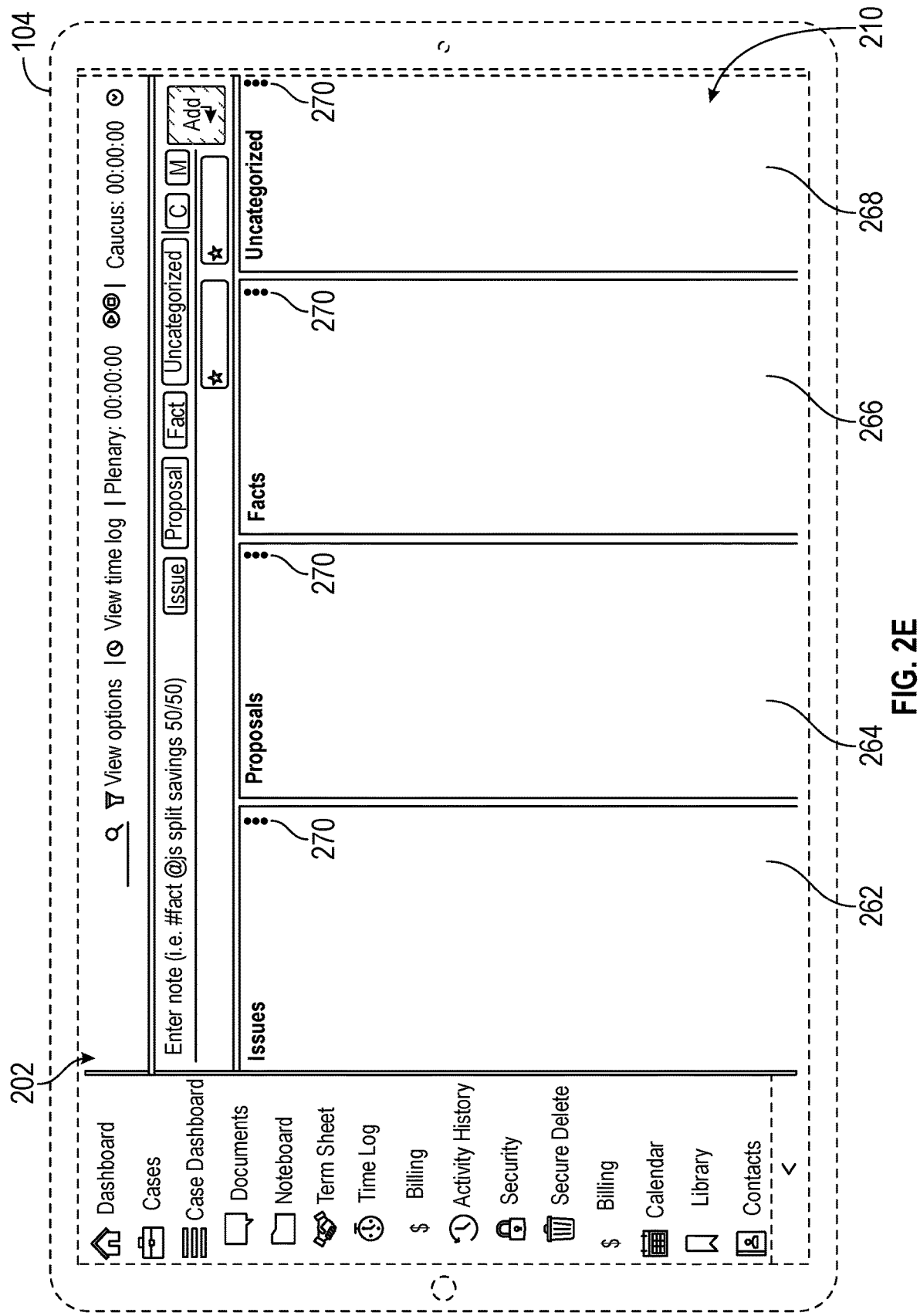
FIG. 2E is a schematic view of an exemplary noteboard module displayed on a user device.

An exemplary embodiment of the notecard display component 210 of the noteboard module graphical display 202 is discussed with reference to FIG. 2E. The notecard display component 210 is primarily composed of two or more swim lanes (for instance 262, 264, 266 and 268 in a preferred embodiment). The number of swim lanes and their labels correspond directly to the notecard type flags. The notecard type flags can be customized for user preference or the needs of a particular dispute resolution setting. In a preferred embodiment optimized for civil litigation mediators the swim lanes are provided as "Issues" 262, "Proposals" 264, "Facts" 266 and "Uncategorized" 268. Regardless of the number of swim lanes or their labels, the notecards are placeable into one of the swim lanes available in an application when created (e.g., using the notetaking entry component 208 in connection with FIG. 2D).

Issue type flagged notecards are preferably used to indicate a topic, problem or general issue that the mediator deems useful to track and are displayed within the Issues swim lane 262. Fact type flagged notecards are preferably used to indicate a piece of information that the mediator deems to have potential relevance in reaching a resolution and are displayed within the Facts swim lane 266.

In a preferred embodiment the uncategorized type is set as the default notecard type flag and the corresponding swim lane 268 holds all notecards that are not flagged with a specific notecard type. Notecards can be categorized into other swim lanes by click and drag operations or via menu selections throughout the dispute resolution session.

The proposal type flagged notecards are held in the Proposals swim lane 264, which is fixed and integral to the consensus building and guided agreement drafting functionality of the platform. Proposal notecards capture offers and counteroffers when attempting to build a consensus and reach a resolution to the dispute. Proposal type flagged notecards have additional functionality with respect to notecards flagged in other, secondary flag types, as described in further detail elsewhere herein. These secondary flag types (e.g., Issues 262 and Facts 266) can be altered and their number increased or decreased to suit needs of a specific deployment of the platform. In preferred embodiments, the notecard display component 210 will include at a minimum a default swim lane and a proposals swim lane.

In connection with the disclosed platform, the term "notecard" is used to describe a visual and logical container that is associated with a note. A "note" can be any content that the user chooses to capture/record as a note that relates to a dispute resolution case. Several exemplary features of a notecard are depicted in schematic form and described with reference to FIG. 3 and FIG. 4. Exemplary notecards 302 and 402 are preferably displayed on the display of a user device with card-like boundaries, such as a rectangle with rounded corners as with 304 and 404, for instance. Other shapes and stylistic choices are considered encompassed by the instant disclosure insofar as the present disclosure contemplates the visual presentation of a notecard-like feature associated with a given note as entered by the user. Where the note information being recorded is not textual, for example a digital video file, other stylistic choices consistent with the object of providing readily ascertainable visual cues as to the content of a note may be employed without departing from the scope of the invention. Whatever the format of data being recorded as a note within a notecard, an exemplary notecard such as 302 will exhibit a primary content area 306, here depicted as lines of text.

Figure 4:
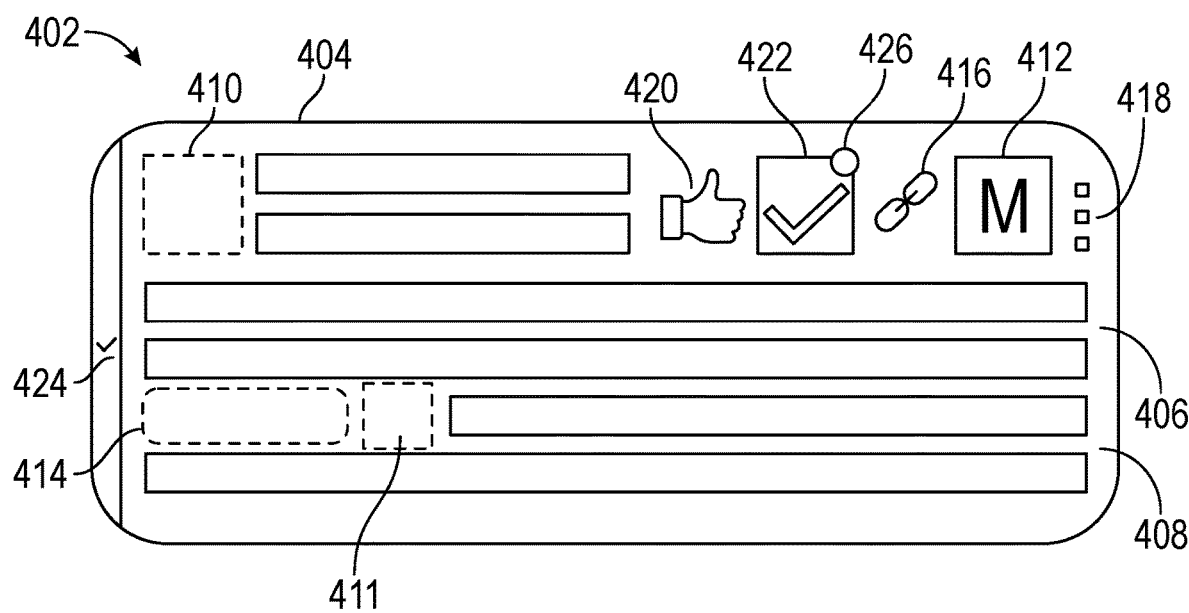
FIG. 4 is a schematic view of an exemplary notecard.

In some instances, the primary content area will be resized, or the notecard area simply enlarged to allow for one or more additional linked or nested content areas. The exemplary notecard 402 shown in connection with FIG. 4 is depicted with a primary content area 406 and a nested content area 408, for example. Notecard nesting functionality greatly improves a mediator's ability to connect various pieces of content together in meaningful ways and in a visual manner. As can be seen in further detail below, the nest content area will contain linked content from a different notecard. In this manner the mediator can, for example, link relevant facts to legal or practical issues presented by each unique dispute.

Another optional but useful feature of the invented notecards is the attribution flag (see discussion in connection with 258 with reference to FIG. 2D). When entering a note and choosing to attribute said note to a participant in the dispute resolution proceeding, the notecard will display the attribution flag in an attribution portion 310 of the graphical display of the notecard. An example of primary and nested attribution portions is also illustrated in connection with FIG. 4 at 410 and 411, respectively. While in preferred embodiments of the platform attribution is optional when utilizing the notetaking function, attributing note content where applicable is considered advantageous for several reasons. First, the use of attribution allows for more filtering options when managing complex cases with a large number of participants and notecards. This in turn reduces the cumbersome process of scrolling through large digital notetaking files or flipping through a paper notebook to locate the desired note, as is common in known methods of conducting dispute resolution proceedings.

Further exemplary embodiments of the notecard feature may also include the display of a context flag in a context portion, as seen at 312 and 412 for exemplary notecards 302 and 402, respectively. During the notetaking process the mediator may optionally indicate a context flag associated with the note (as described with reference to FIG. 2D, for example). Context flags allow for sorting and filtering notes based on the context in which the note was recorded, such as during a caucus session (e.g., as at 312) or notes originating from the neutral user/administrator (e.g., as at 412). In a preferred embodiment, the addition of a caucus tag to a notecard will result in the contents of the notecard being obscured from view absent further interaction by the user. This protects the inadvertent disclosure of sensitive or confidential information by the user during caucus or plenary sessions. Similarly, the addition of a mediator tag to a notecard will result in the notecard being hidden entirely by default to segregate the user's private thoughts on the dispute and potential agreement avenues.

Figure 3:
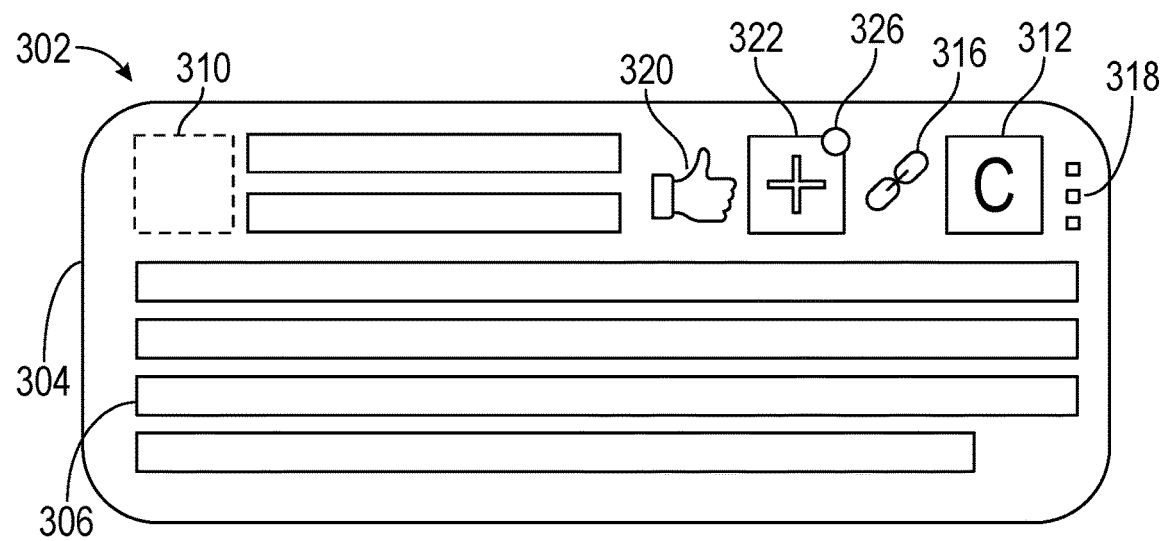
FIG. 3 is a schematic view of an exemplary notecard.

Linking and nesting functionality with respect to notecards has been found to be greatly advantageous in administering dispute resolution proceedings, avoiding inefficient methods of rewriting handwritten notes as more information and complexities are added to the user's understanding of the dispute throughout the mediation process. Linking and nesting also provide advantages over known methods of digital notetaking by providing fluid visual cues to the process that are not known to exist in the art currently. Notecard 302 depicted in connection to FIG. 3 is an exemplary embodiment of a notecard that has been linked in a child relationship to another notecard, for example notecard 402 depicted in connection to FIG. 4. In such a scenario, the graphical display of the user device may be configured to display the contents of the primary content area 306 in the child notecard (here, notecard 302) within the nested content area 408 of the parent notecard. If applicable, some exemplary embodiments of the parent notecard in a nested/linked relationship will further display a nested notecard type portion 414, which displays the label or title of the notecard type flag (i.e., swim lane assigned) of the child notecard 302. Thus, if for instance the child notecard 302 was entered with a notecard type flag of "Facts," the nested notecard type portion 414 in the parent notecard 402 will display as "Facts." For both parent and child notecards, a linking operation may optionally result in the appearance of a linked notecard filter button, as at 316 and 416 for notecards 302 and 402, respectively. These buttons 316 and 416 when actuated, may be used to emphasize the original notecards that are grouped together via linking. This is preferably accomplished with visual alterations of the graphical display to selectively highlight the appropriate notecards, dim, hide or otherwise obscure the unrelated notecards, or some combination thereof, that quickly draw a user's attention to the relevant notecards.

In addition to or in lieu of visual actuation elements displayed on exemplary embodiments of the notecard elements, a text-based contextual navigation menu may also be provided via menu access button 318 and 418 as shown in connection with notecards 302 and 402, respectively. The menu may provide an alternative manner in which to carry our notecard-related commands, such as but not limited to: editing the note contents, linking or unlinking with other notecards, blurring, striking or otherwise altering the visual appearance of a particular notecard, and adding, removing or otherwise editing one or more categorization flags such as type flags, attribution tags and context tags.

The general visual and operable elements that may be present on a given notecard also include several mechanisms specific to notecards flagged with a notecard type of "Proposal." In exemplary embodiments, when a notecard is given the notecard type of "Proposal," at least two additional functions can be made available to the user. The first is the proposal acceptance button 320. In preferred embodiments, the proposal acceptance button 320 is presented in a first visual state when the proposal notecard 302 is first added to the noteboard. This proposal—typical attributable to one of the dispute resolution participants—can be accepted by a counterparty. In the case of an acceptance, the proposal acceptance button may be presented in a second visual state that indicates such acceptance, as at 420 shown in connection with notecard 402.

As an alternative to acceptance of a given proposal, a counterparty may wish to make a counterproposal. This can be easily accomplished via a counterproposal button 322, as shown in connection with notecard 302. Selection of the counterproposal button 322 opens and focuses on a dialogue box into which a counterproposal and the party to which it is attributable may be entered and submitted for consideration by the original proposing party. Turning briefly to FIG. 5 a view of a notecard display component 510 of an embodiment of a partially displayed noteboard is illustrated. The notecard display component 510 is shown populated with exemplary trade secret dispute data in which a notecard 502 of the proposal type exhibits a proposal acceptance button 520 in a first or unaccepted visual state, indicating that a proposal has been made by a dispute resolution participant as noted by the user and remains open for acceptance. This embodiment also depicts an exemplary implementation of the linked notecard filter button 516 to emphasize the grouped proposal notecard 502 and its child notecard 503 by dimming the unlinked cards.

The unaccepted nature of the proposal embodied in the proposal notecard 502 in FIG. 5 also permits the user of the platform to select the counterproposal button 522 to record any counterproposals made in response to the offer. Actuating the counterproposal button 522 opens a counterproposal entry overlay form, as shown at 602 in the partial view of an exemplary noteboard module display in connection with FIG. 6. In an exemplary embodiment the counterproposal form 602 includes a counterproposal text entry field 604 and a party attribution selection list 606. In some embodiments the counterproposal text entry field 604 may be prepopulated with the contents of the most recently outstanding proposal offered in the session. Party attribution selection lists may be embodied as a radio button selection option, a prepopulated drop-down list, a manual text entry field, or the like.

Returning to FIGS. 3 and 4, other optional features of an exemplary embodiment is described. First, the proposal type notecards may include a counterproposal button as described in connection with 322. In some embodiments an unaccepted proposal (or counterproposal) notecard will be graphically display with the counterproposal button taking a first form as in 322, indicating that a counterproposal may be made. If the proposal set forth in the notecard has been accepted, as with notecard 402, the counterproposal button may take a second form as in 422, wherein a counterproposal may not be made. In an exemplary embodiment the button is represented as a checkmark after proposal or counterproposal acceptance. Furthermore, a visual aid may be employed to an acceptance portion of the proposal notecard, as in 424 shown in FIG. 4 to draw the attention of the user to differentiate between tentatively complete or incomplete proposal negotiations.

Figure 7:
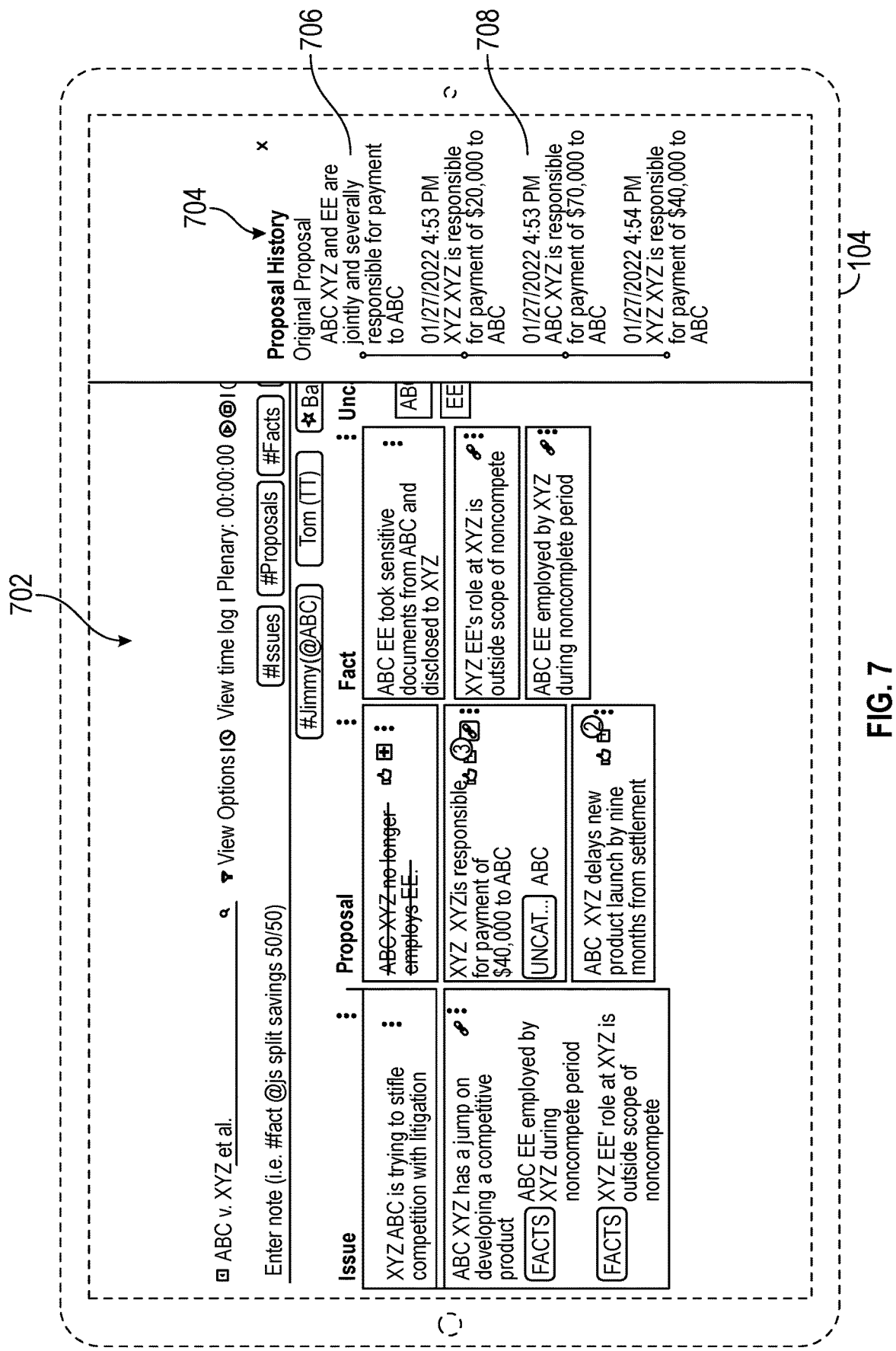
FIG. 7 is a schematic view of an exemplary notecard display component with an exemplary proposal history overlay.

Proposal notecard embodiments may also exhibit visual cues regarding the proposal history, as well as links to the proposal history itself. In an exemplary embodiment the proposal type notecards may be provided with a proposal counter indicator as with 326 and 426 for notecards 302 and 402, respectively. These indicators may be provided as an integer number corresponding to the number of proposals and counterproposals being tracked with respect to that particular notecard, thereby implying the existence of an available negotiation history. In some embodiments such a history is accessible via the menu access buttons 318 and 418 as shown in connection with notecards 302 and 402, respectively. In further embodiments, a separate graphical element or button may be provided to link directly to the negotiation history for a particular proposal thread. Turning to FIG. 7, a partial view of a noteboard graphical display 702 is illustrated in which a proposal history overlay 704 which carries proposal history information within the graphical display, including information such as the text of each proposal and counterproposal (e.g., at 706) and metadata associated with the proposals (e.g., at 708) such as dates and times. Preferably such data is presented in a chronologically ordered format for ease of review.

Figure 8:
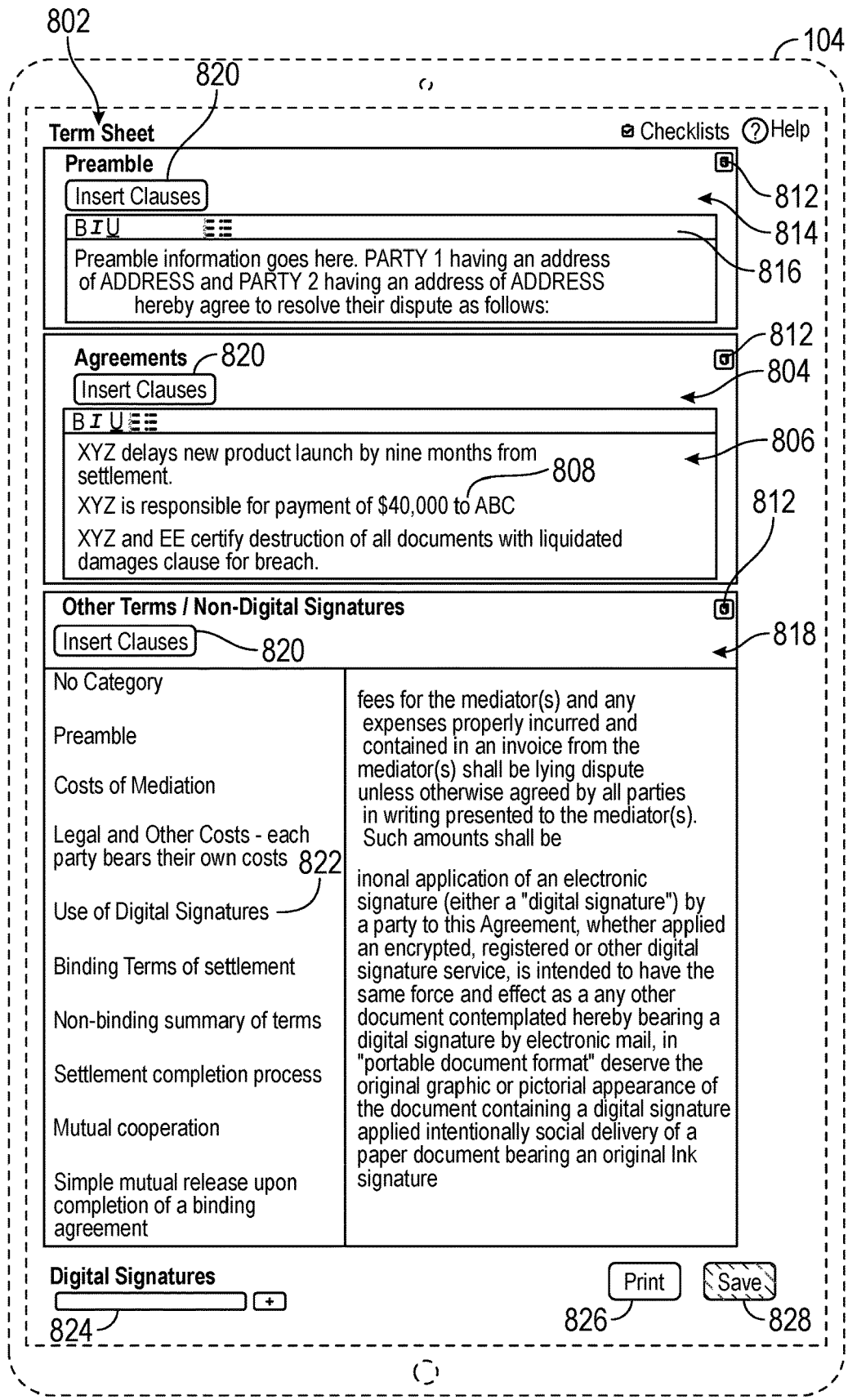
FIG. 8 is a schematic view of an exemplary term sheet module displayed on a user device.

A further exemplary embodiment of a graphical display 802 depicted on the display portion of a user device 104 is illustrated in connection with FIG. 8. In particular, the graphical display 802 depicted in FIG. 8 represents an exemplary term sheet module of the platform that is provided for guided term sheet building. In some embodiments this module and its functionality may be accessed via the navigation menu item 230 as described in connection with FIG. 2B, for instance. In a preferred embodiment, the term sheet module displays several distinct graphical and functional components on the graphical display 802. One such component is the agreements clause component 804. The primary purpose of the agreements clause component 804 is to facilitate the accurate and efficient memorialization of resolutions achieved during a dispute resolution process. To further this goal, the agreements clause component 804 is provided with at least one editable text box 806. The editable text box 806 is prepopulated with data (e.g., textual agreement clauses 808) from proposal type notecards which have been accepted by the necessary counterparties. In some embodiments standard text editing features and functionality may be provided, as at 810. Alternatively, or in connection with stylistic text editing features, a copy button 812 is also provided in some embodiments to enable simple transfer of agreement clauses into a separate word processing application of choice.

In some embodiments the aggregation and ordering of resolution clauses agreed upon by the parties to dispute resolution proceedings is sufficient to create a simple term sheet and memorialization of an agreement reached in principle, to be formalized in writing separately from the mediation session. In preferred embodiments, however, the dispute resolution administration platform is considered ideally used for preparing—and in many cases executing—fully formed formal settlement agreements or other similar documentation appropriate for the dispute resolution forum in which the platform is being used. To that end, several additional optional components are provided in preferred embodiments. For example, a preamble clause component 814 is useful to quickly construct agreement preambles, with party information for those intended to be bound by a voluntary settlement reached through the process and other standard contractual features. It is preferable to also provide at least one editable text box 816 in a manner similar to that described in connection with the agreements clause component 804. Similarly, in a preferred embodiment a standard terms component 818 may be provided as well to give greater customization to the user when creating a term sheet.

Each of the one or more clause components (e.g., agreements 804, preamble 814 and standard terms 818) included in the term sheet module are in some embodiments further provided with pre-drafted clause insertion functionality by way of an insert clause button 820. By selecting an insert clause button 820, a user may choose from any number of contractual clauses or structures suitable for a given dispute to quickly build a fully executable and comprehensive agreement. This powerful module thus eliminates the common scenario in which the disputing parties tentatively agree to major proposal terms to be reduced to a formal agreement at a later date, only to have the negotiated settlement fall apart due to problems in the drafting process. The additional drafting time outside of in-person proceedings also permits parties to reconsider and rescind their tentative agreement, a failure that is oftentimes simply the result of emboldened resolve when the parties are not in physical proximity, as opposed to a measured reevaluation of the merits of the dispute. In an effort to reduce these failures, the term sheet module was invented to integrate with the novel notetaking and consensus building/tracking features of the noteboard module and thus increasing the effectiveness of the overall dispute resolution administration platform.

Users are thus able to carefully construct their pre-drafted clauses to fit with common fact patterns and settlement agreement features such that the administration of dispute resolution proceedings and the reduction of negotiated settlements to an enforceable agreement occurs efficiently in a single session. To achieve this, a preferred embodiment of the term sheet module is also provided with a digital signature component 824 to facilitate the electronic signing of a finalized settlement agreement. Copies can also be printed for review, recordkeeping or to apply wet signatures, via print button 826. In some embodiments the term sheet contents can also be saved via save button 828 to a word processing file, for example. The result of the methods associated with the term sheet module are preferably embodied in a digital agreement file, which may be embodied in some instances as a digital word processing file containing the various clauses and agreements negotiated, drafted and agreed upon during an ADR session.

Figure 9A:
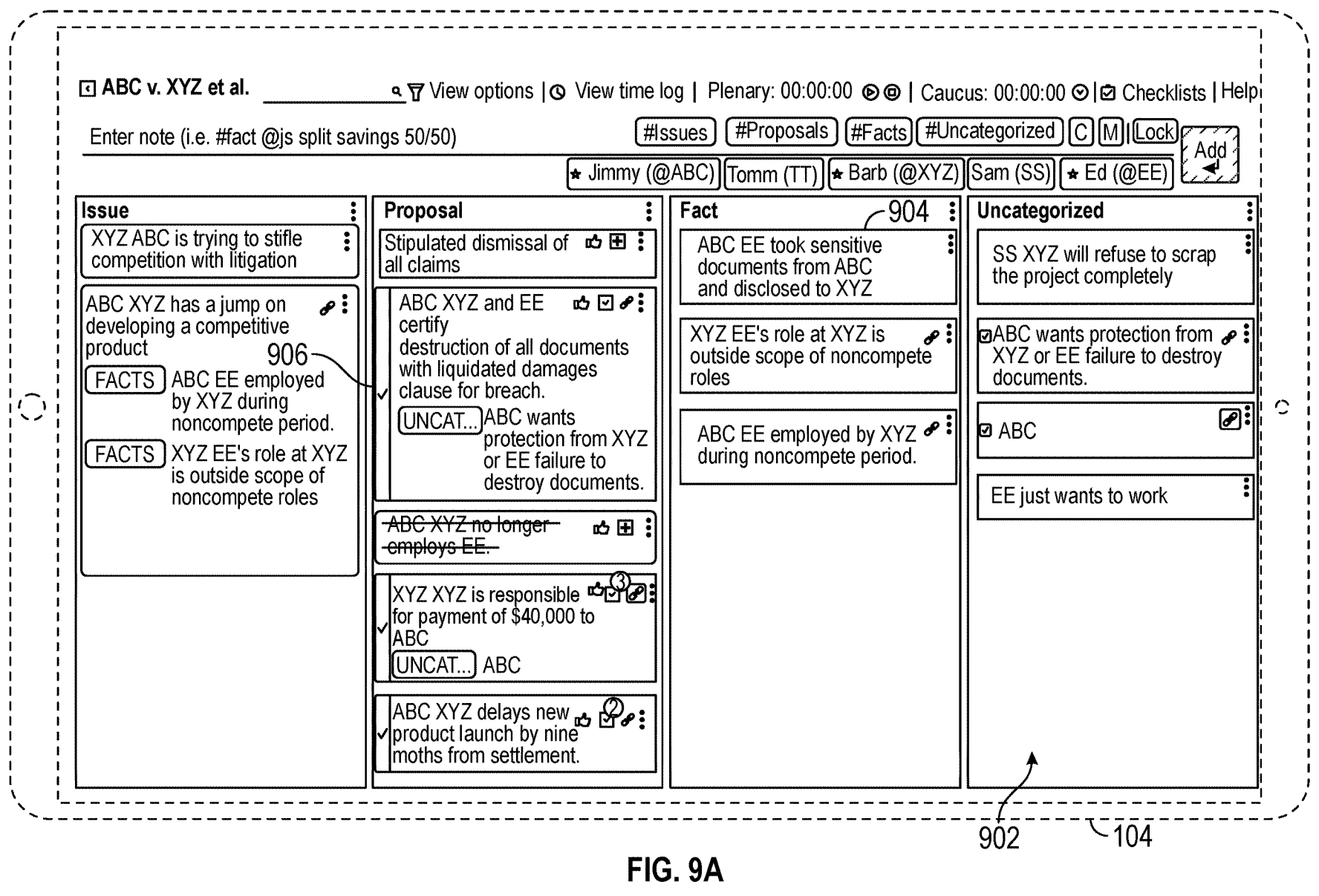
Figure 9B:
FIG. 9B is a schematic view of an exemplary noteboard module displayed on a user device illustrating dynamic notecard linking.

While the powerful visual cue capabilities of the noteboard module have been discussed in detail herein, the graphical drag and link functionality is further disclosed in connection with FIGS. 9A-9C, which depict an exemplary embodiment of a noteboard module displayed on a graphical display 902 depicted on the display portion of a user device 104. This exemplary embodiment of the noteboard module displays example notecards representing notes taken by a user during a trade secret dispute resolution proceeding. To illustrate the drag and drop linking functionality, three views of the graphical display changing over time in FIG. 9A-9C are referenced herein, starting at FIG. 9A and ending at FIG. 9C. In this exemplary hypothetical, the user desires to link the fact type notecard 904 with the proposal type notecard 906 to later more readily reference one of the reasons that the destruction of documents proposal was made by the ABC party. To make this connection, the user simply clicks, points or otherwise continuously selects the factual notecard 904 and drags it—as shown by the intermediary view in FIG. 9B-within the boundaries of the appropriate proposal notecard 906. In an exemplary embodiment, the noteboard module then creates a link between the notecards, displays the linked notecard filter button 916 on each notecard now linked, and nests the information in notecard 904 into a nested content area 908 of the proposal notecard 906. The linked state is depicted in FIG. 9C, and any edits to the factual notecard 904 at this stage will be reflected in the nested content area 908 of the proposal notecard 906.

Figure 10A:
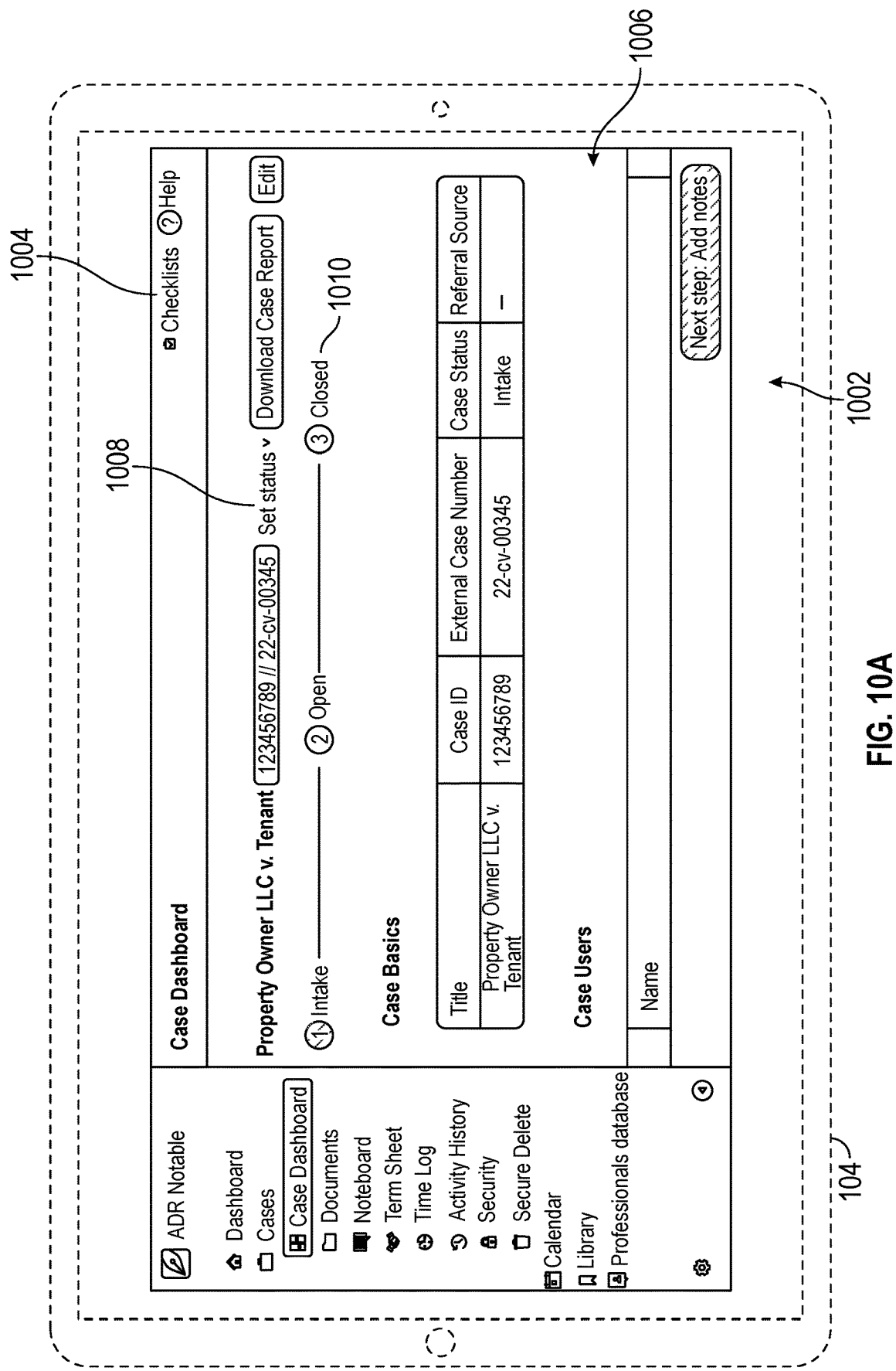
FIG. 10A is a schematic view of an exemplary case dashboard module displayed on a user device.

One exemplary feature of the invented system and methods is the guided case workflow feature. The guided case workflow feature was developed to provide optional and customizable guided case management to ADR professionals, reducing mistakes and operational administration costs. To illustrative the main components of the guided case workflow feature, a first case dashboard module is shown on the graphical user display 1002 of the user device 104 in connection with FIG. 10A. The case dashboard module displays case-level information pertaining to a particular ADR case in a case information display component 1006, such as but not limited to basic case information, case participant information, users of the software platform assigned to the case, and other useful information related to the case, such as case report and admin notes. The case dashboard module may also optionally provide a case status actuator 1008 and a guided case progress indicator 1010. The former may be implemented to allow a user to change the status of a case for record-keeping and reporting purposes or to assist the guided progression of the administration of the case as will be discussed more fully herein. The guided case progress indicator 1010 is provided as a visual indicator of the progression through the case lifecycle that has occurred, from intake to close. In some embodiments, the case status actuator and guided case progress indicator may share options for statuses and progress points. That is, it may be considered useful for the case progress points to reflect the case statuses that are available via the case status actuator 1008. In some embodiments, case statuses may be provided as intake, open, resolved—partially, resolved—fully, and closed. In other embodiments, case statuses may be provided as intake, open and closed. In further embodiments, the case statuses may be customizable, differentiable on a case-level basis (i.e., different statuses provided for each case or case type), or both.

Figure 10B:
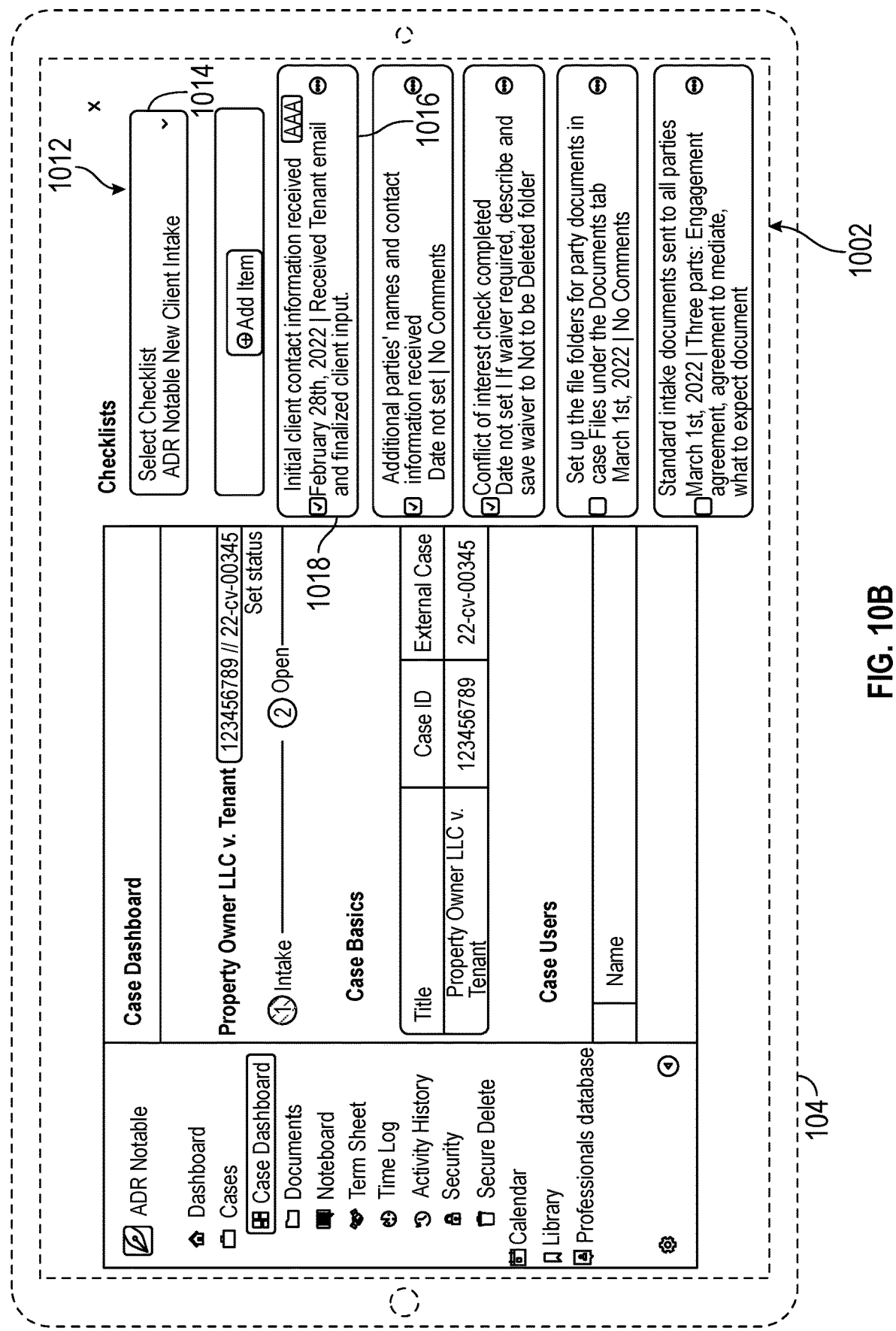
FIG. 10B is a schematic view of an exemplary case dashboard module displayed on a user device.

An important aspect of the guided case workflow feature is the checklist functionality, accessible in some embodiments via the checklist button 1004. In some embodiments, the actuation of the checklist button 1004 calls a checklist overlay form, shown at 1012 in connection with FIG. 10B. At various stages in the ADR case progress, predetermined or customizable checklists are used to assist in the guided completion of the case. The checklists may be selectable in the checklist dropdown 1014 of the checklist overlay form 1012, for example in the illustrative example as a firm-specific new client intake form checklist. At the intake stage, many steps need to be accomplished by the administrators of the ADR process to successfully complete the process from intake to case closure. Each checklist may be configured to contain a multitude of discrete tasks that are to be completed at each stage of the case administration process. The discrete tasks associated with each checklist are each displayed in a task component 1016 on the checklist overlay form 1012 once the appropriate checklist is selected from the checklist dropdown 1014. Actuatable checkboxes 1018 are also provided for each task component 1016 displayed on the checklist overlay form 1012 to enable the user to mark complete tasks. In some embodiments, after actuating a checkbox 1018 complete, the task component 1016 to which the checkbox 1018 is associated is moved to the end of the list to conveniently place incomplete tasks at the top of the list.

Figure 11A:
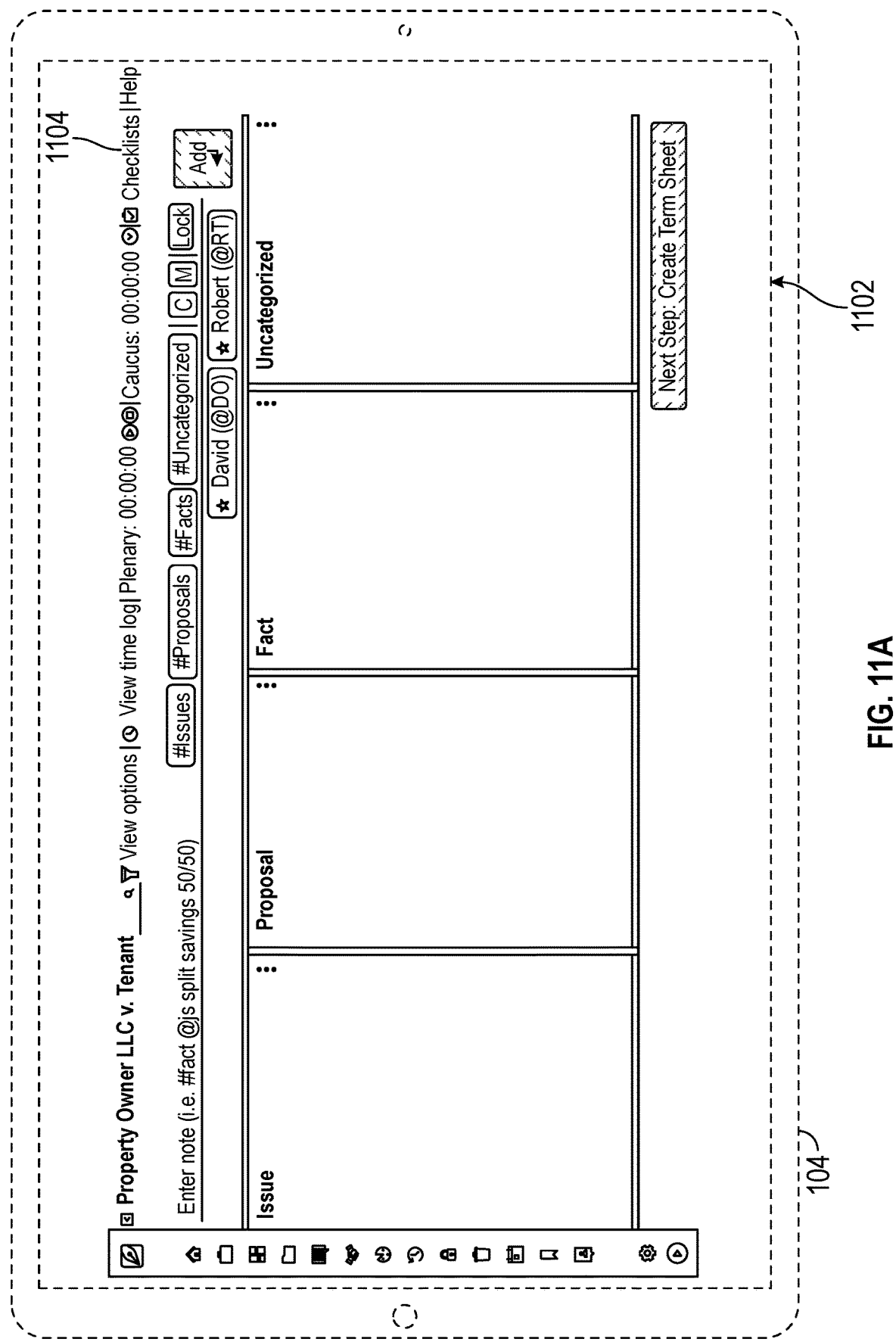
FIG. 11A is a schematic view of an exemplary noteboard module displayed on a user device.
Figure 11B:
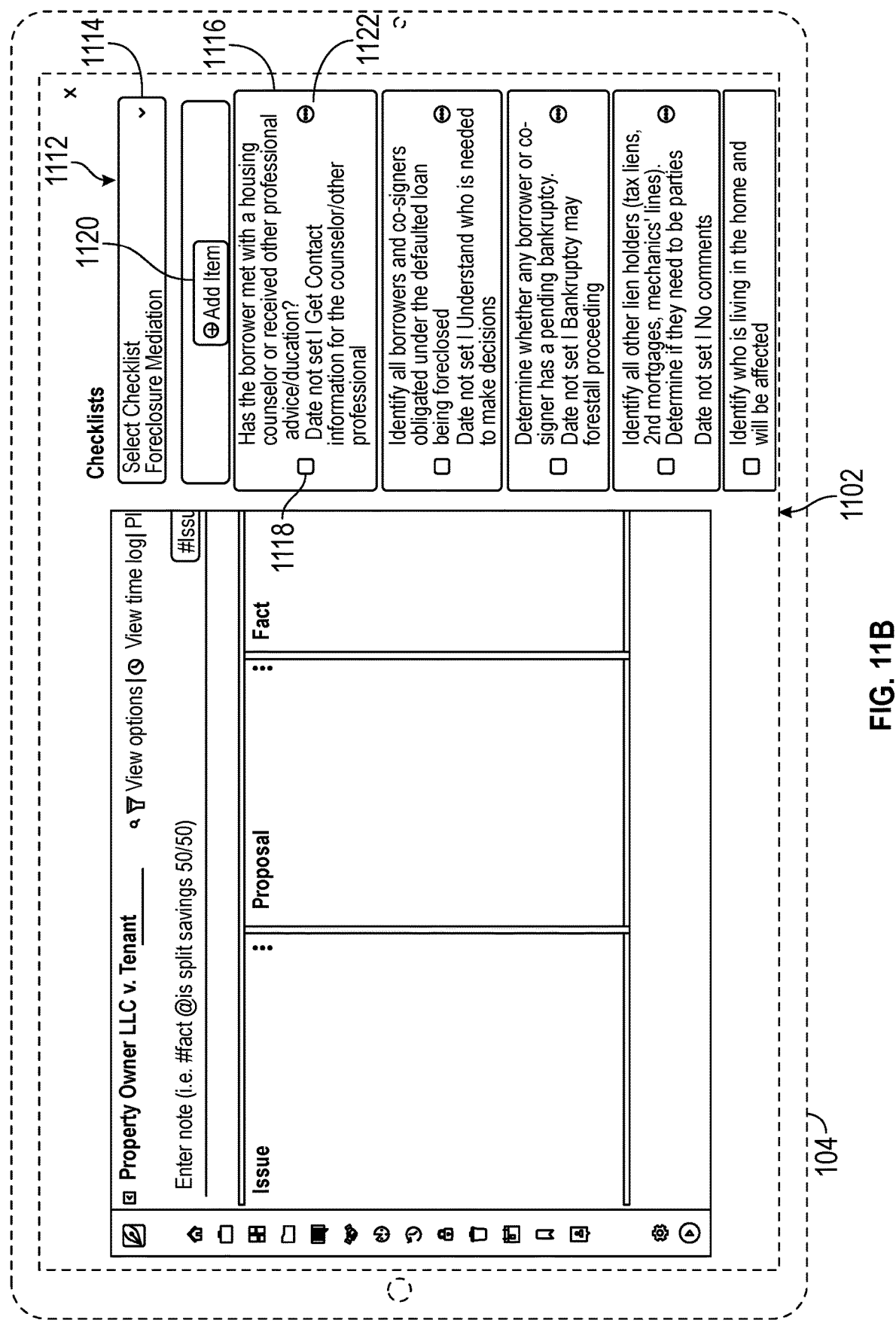
FIG. 11B is a schematic view of an exemplary noteboard module displayed on a user device.
Figure 11C:
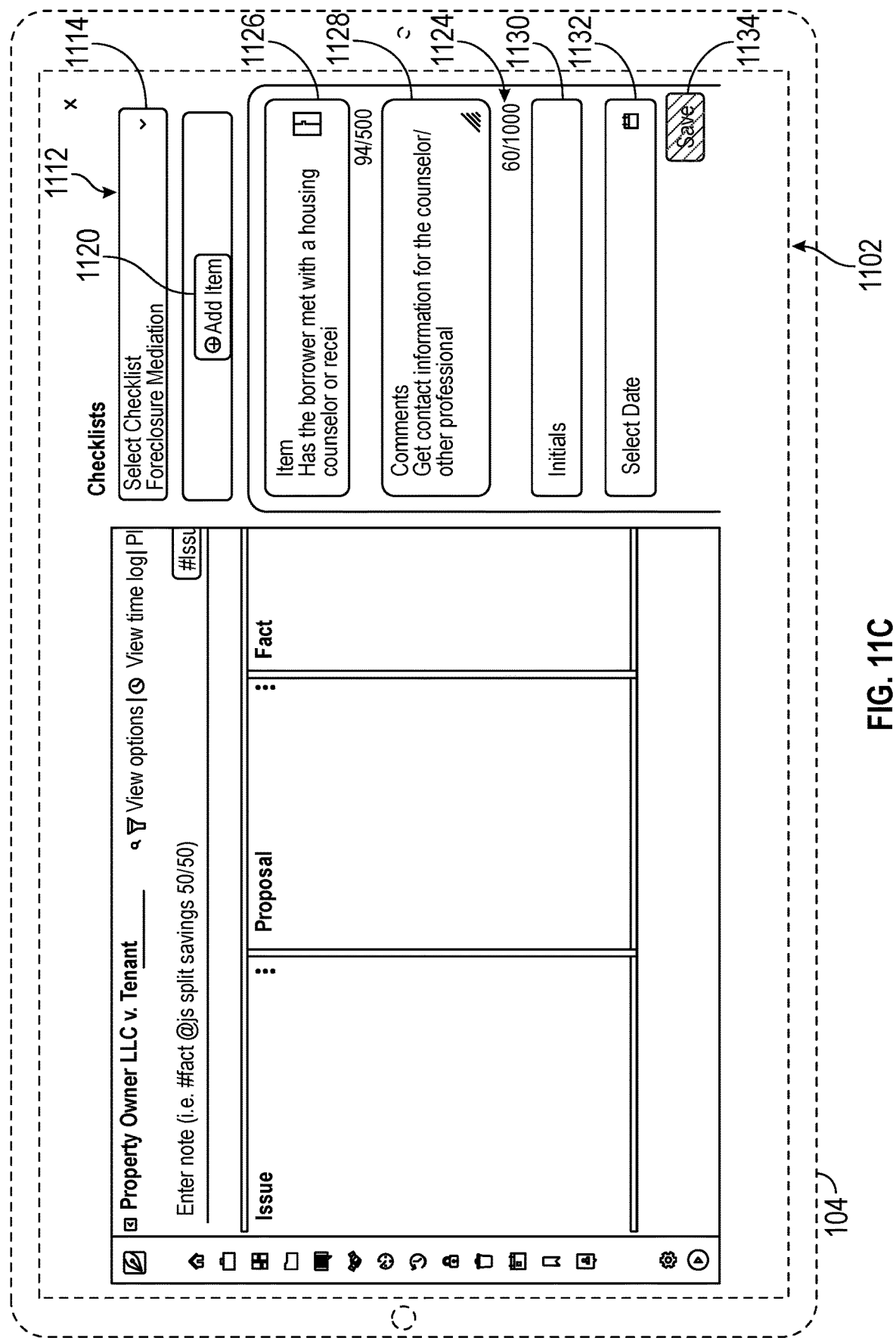
FIG. 11C is a schematic view of an exemplary noteboard module displayed on a user device.

Turning to FIGS. 11A-11C, a further exemplary embodiment of the guided case workflow feature is depicted in use in connection during a later step in the process, namely, during the open or active stage of the ADR case. In many cases this stage will involve heavy use of the notetaking component while in session with the ADR participants. Turning to FIG. 11A, an exemplary embodiment of the noteboard module graphical display 1102 is illustrated in connection with a user device 104. The checklist button 1104 is shown in this embodiment in the upper right corner of the display area 1102, and its actuation calls a checklist overlay form, shown at 1112 in connection with FIG. 11B. The checklist overlay form 1112 can optionally display a checklist dropdown 1114 from which prepared checklists tailored to a given case type, for instance, may be selected. As with the exemplary intake checklist described in connection with FIGS. 10A-10B, actuatable checkboxes 1118 are also provided for each task component 1116 displayed on the checklist overlay form 1112 to enable the user to mark tasks as completed. In some embodiments, an actuatable "Add Item" button 1120 may also be provided to permit in-session checklist additions that might be helpful in a particular ADR case.

Each of the task component features 1116 may be provided with an edit, or menu, button 1122 that permits editing of the task as needed by the user. Actuating the edit button 1122 or the add button 1120 changes a portion of the checklist overlay form 1112 to display the editable fields of an existing or new task on the checklist, respectively. Turning the FIG. 11C, an exemplary task edit overlay form 1124 is illustrated in connection with the selection of exemplary edit button 1122 in FIG. 11B. In the exemplary embodiment, the task edit overlay form 1124 is provided with several editable fields that are prepopulated with the data from the specific task selected for editing, such as a task item field 1126, a task comment field 1128, a user initials field 1130, and a date field 1132. A save button 1134 is further provided to save any changes made to the task selected for editing and therefore write the information to the associated case database, or to save the new task being created. The task item field 1126 can contain the main textual description of the task, whereas the task comment field 1128 might be used for more pertinent details about the task that would be useful in accomplishing the task, or progress notes by those undertaking the task. The user initials field 1130 can be used, for example, to assign tasks to various users of the platform in a multi-user environment, and the date field 1132 can be used to set target deadlines for specific tasks in the case.

Figure 12A:
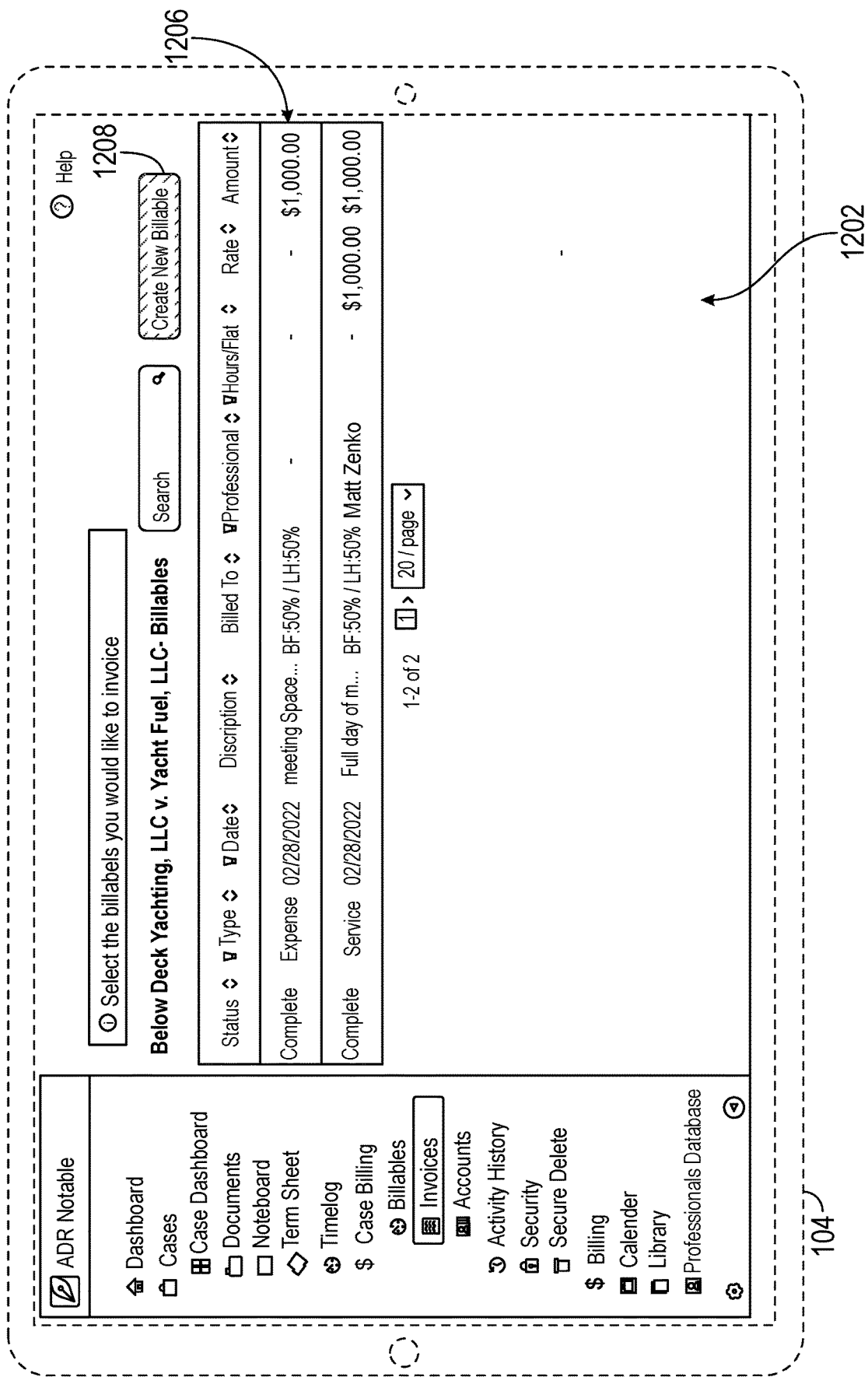
FIG. 12A is a schematic view of an exemplary billing module displayed on a user device.

The invented system and methods further include a billing module. Turning to FIG. 12A, a further exemplary embodiment of a graphical display 1202 is depicted on the display portion of a user device 104. In particular, the illustration shown in connection with FIG. 12A represents an exemplary billables component display 1202 of the billing module. In the case-level billables component, a table of billable information 1206 associated with a selected case is displayed for unbilled charges. This billable information might include, for instance, the type of billable item (e.g., expenses or services), the date on which the charge was made, a description of the billable item, the distribution of billable responsibility among the case participants, amounts, and other such pertinent information with regard to billable items generally. New billable item entries may be entered and associated with the case via the create new billable button 1208, which when selected will cause the user device 104 to display a create new billable overlay form, show at 1210 in connection with FIG. 12B. An exemplary embodiment of the create new billable overlay form 1210 may include, for instance, fields for data entry related to categories of information such as the date of the billable item, the type of the billable item, the parties responsible for payment of the billable item, the distribution of payment responsibility among multiple parties, and a billable item description.

Figure 12B:
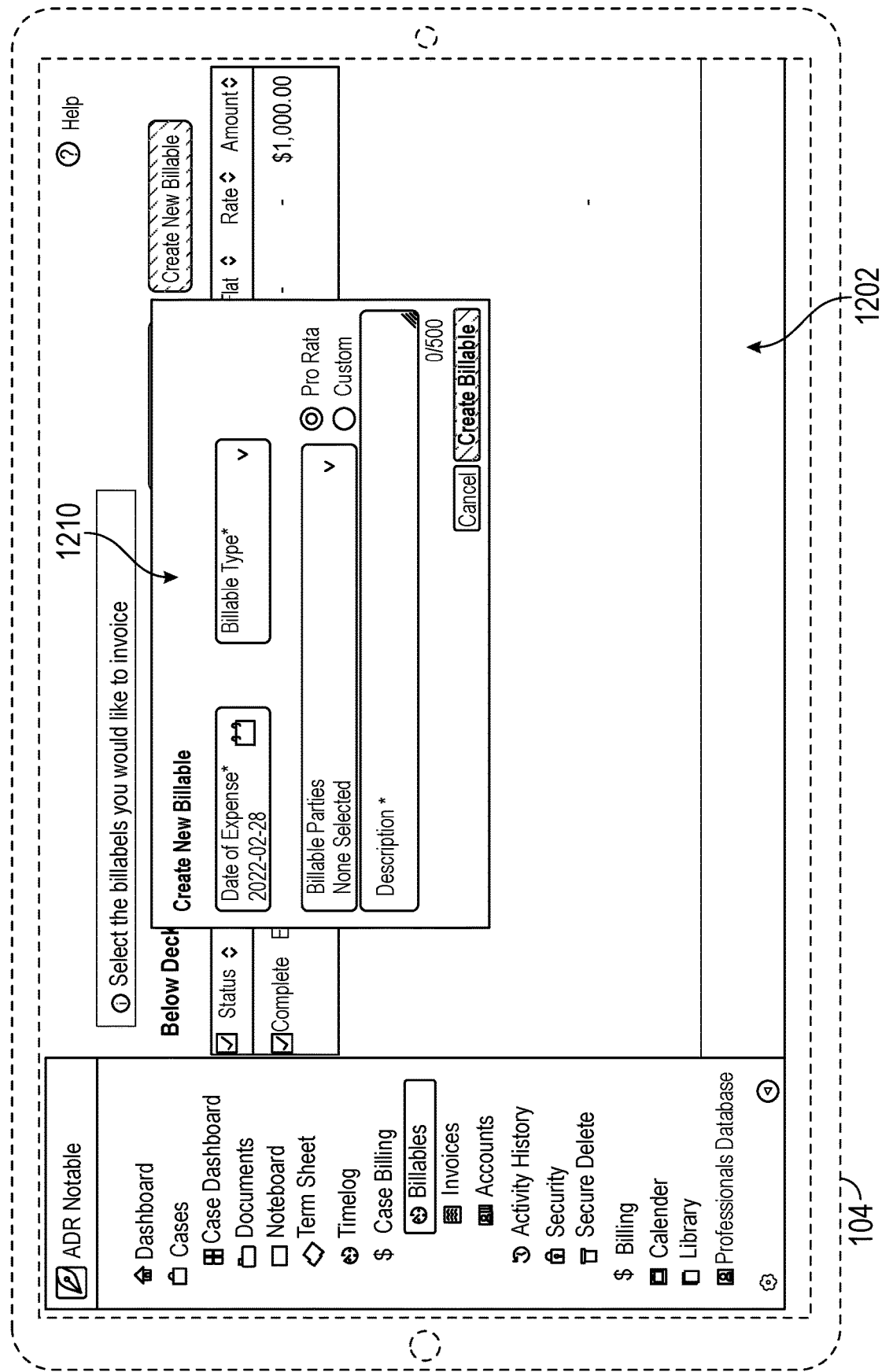
FIG. 12B is a schematic view of an exemplary billing module displayed on a user device.
Figure 12C:
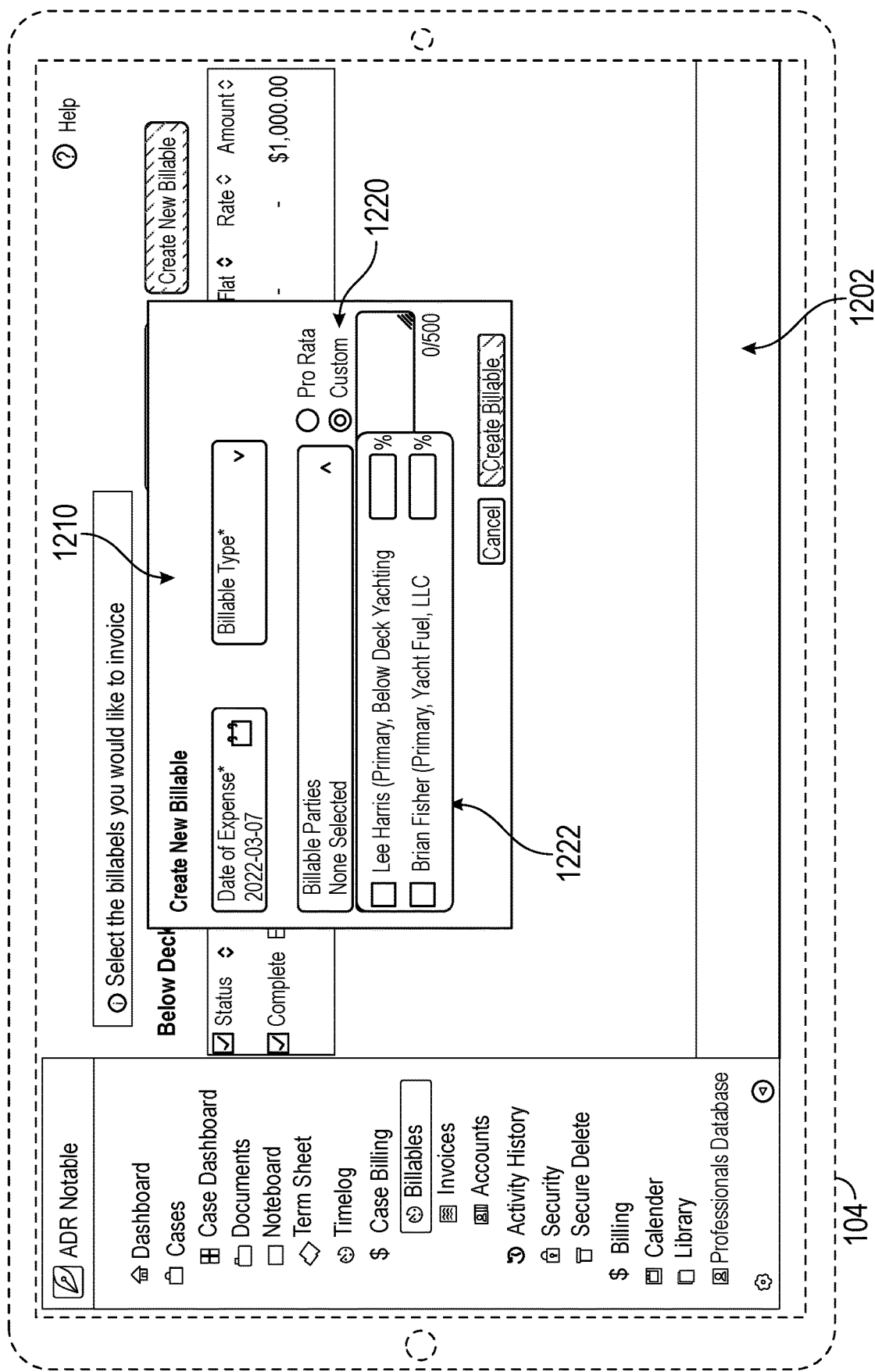
FIG. 12C is a schematic view of an exemplary billing module displayed on a user device.

A further exemplary new billable overlay form 1210 is shown in connection with FIG. 12C. In this embodiment the distribution or apportionment of the charge has been changed from a pro rata basis to a custom allocation by selecting the "custom" option in the apportionment radio button list 1220. Once the custom option is selected, the "billable parties" drop down is made selectable on the display 104 and a its selection provides a custom apportionment drop down 1222 wherein a user may input a custom apportionment according to the proceeding rules or party agreement, for instance.

Figure 12D:
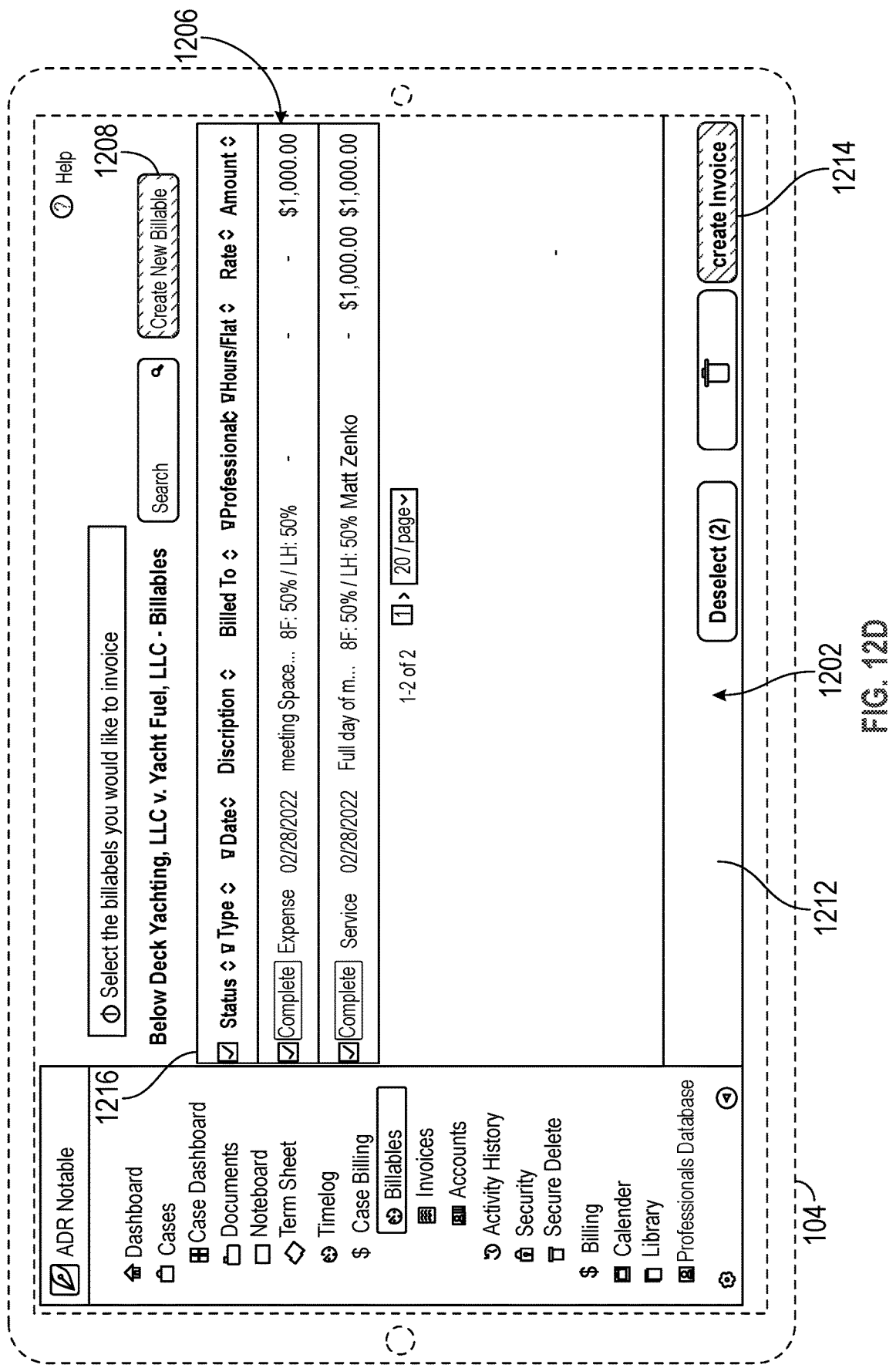
FIG. 12D is a schematic view of an exemplary billing module displayed on a user device.

At the convenience of the user and when the billable item entries are complete and therefore ready for invoicing to the party or parties, the billable component display 1202 of the billing module can be used to select the billable items desired for invoicing. This process is illustrated for an exemplary embodiment in connection with FIG. 12D. The selection of the billable items for invoicing can be carried out via a checkbox selection 1216 for each of the billable items desired for inclusion in the invoicing creation process. The selection of one or more billable item entries from the table 1206 will trigger the billable item action overlay 1212 which in turn carries various operations that can be carried out with respect to the billable item entries, including the command to create a new invoice from the selected billable entries 1214. The selection of this button 1214 will change the user device 104 display to show the invoicing component display 1302 of the billing module, as depicted in connection with FIG. 13.

Figure 13:
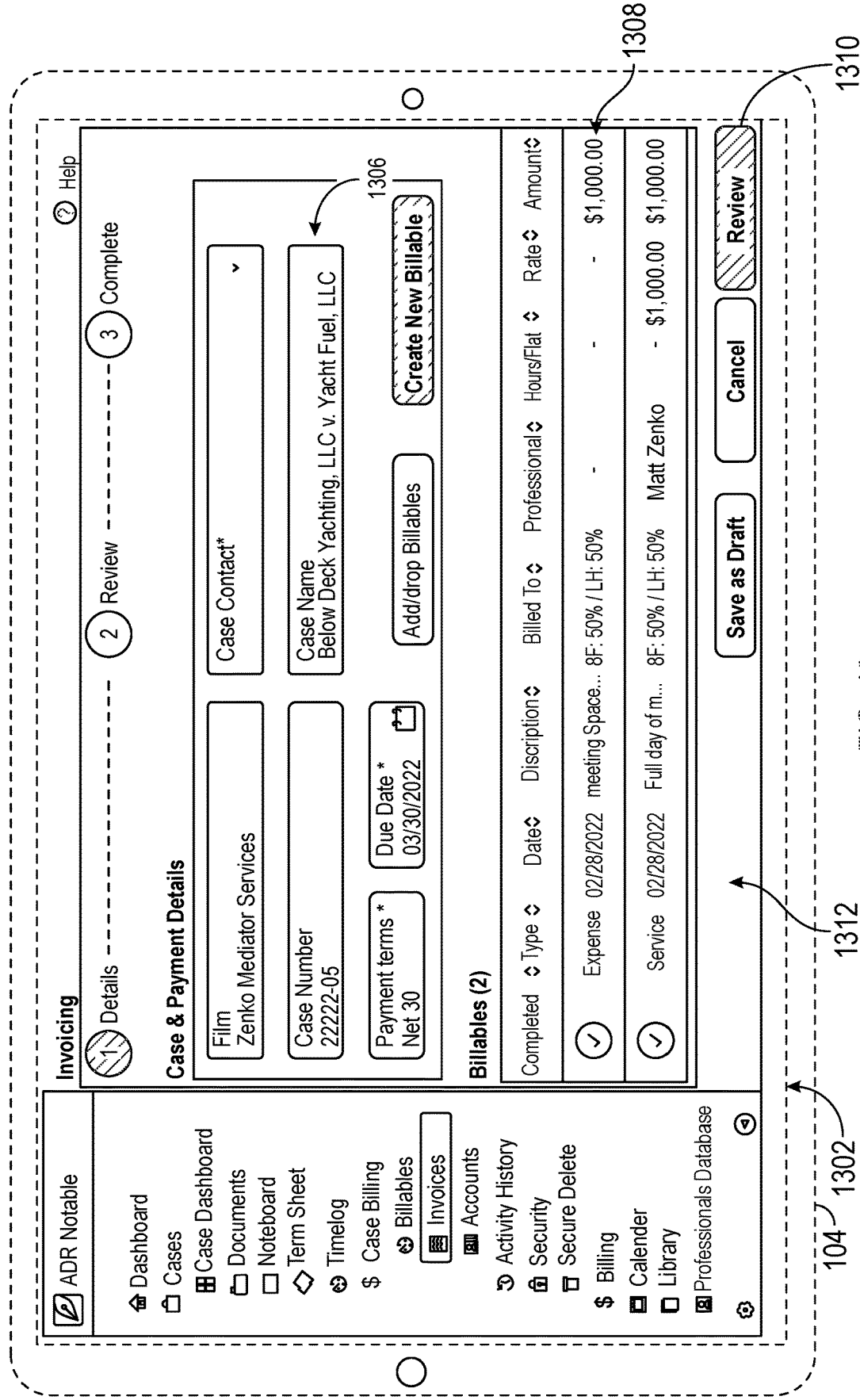
FIG. 13 is a schematic view of an exemplary billing module displayed on a user device.

In FIG. 13, an exemplary detail step of the invoicing component display 1302 is illustrated wherein the billing module is used to create one or more invoices related to the billable item entries selected in connection with FIGS. 12A-12C. At this stage in the guided process, the user can interact with the case and payment details portion 1306 to configure invoice-related items such as payment terms, due dates, and contact information, for example. The billables selected for invoicing may also be reviewed, edited, or added to in a billables portion 1308. Once satisfied with the appurtenant invoicing information, the invoicing action overlay 1312 is used to carry out commands such as saving a draft of the invoice creation in progress, cancel the invoice creation process, or review the invoice prior to finalizing, as at button 1310.

Figure 14A:
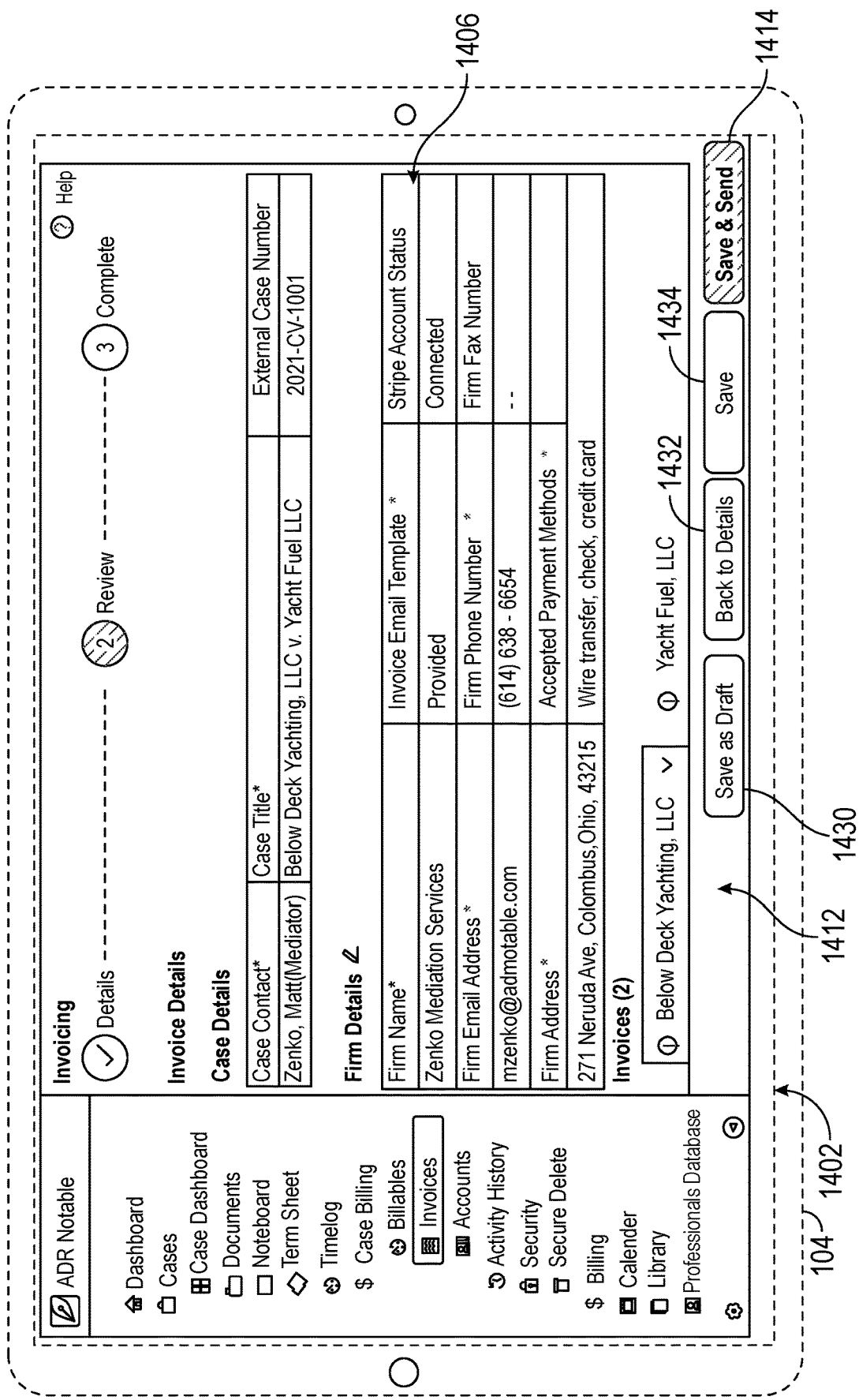
FIG. 14A is a schematic view of an exemplary billing module displayed on a user device.
Figure 14B:
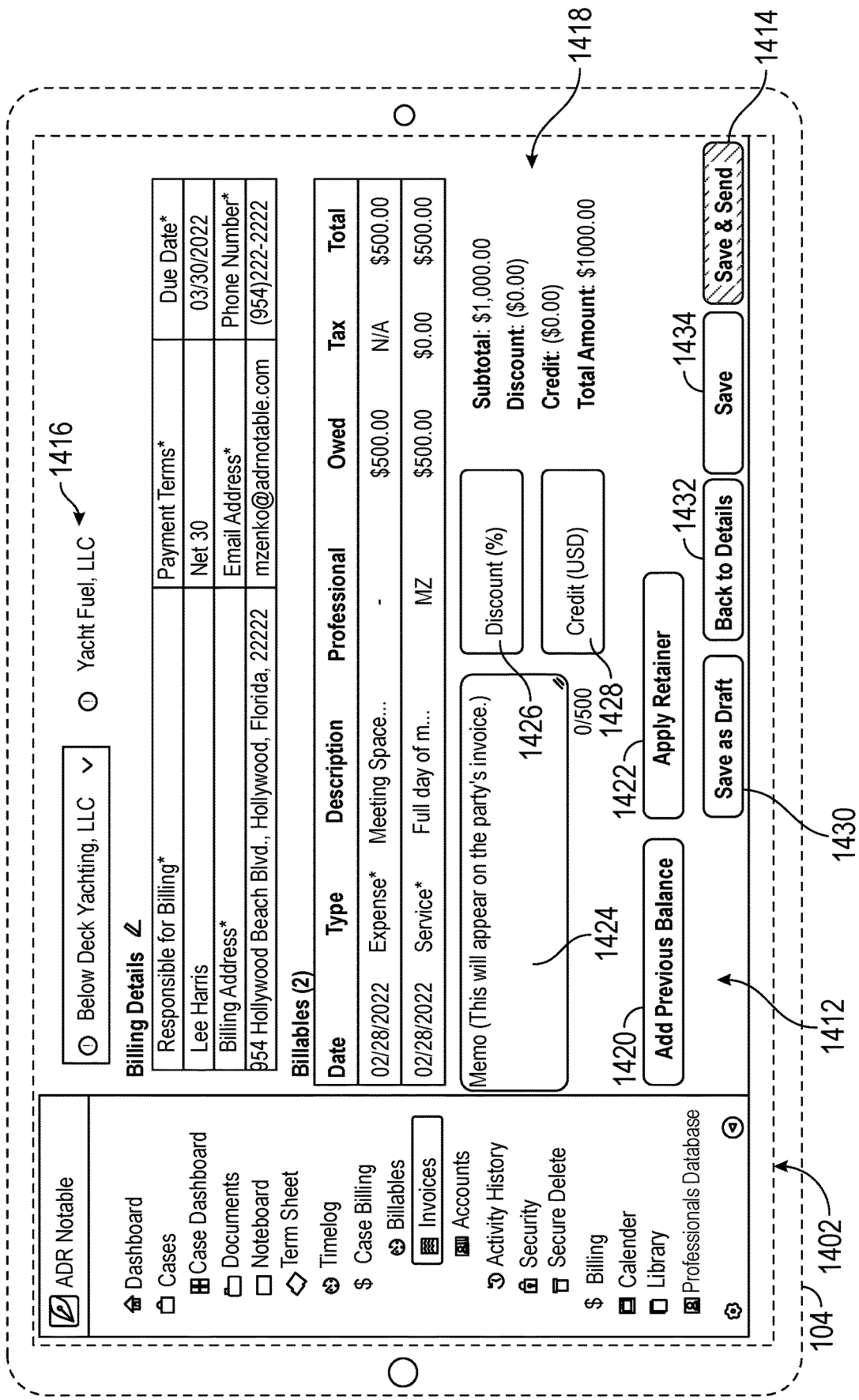
FIG. 14B is a schematic view of an exemplary billing module displayed on a user device.

The selection of the review button 1310 will cause the exemplary invoicing component display to change to the review step, as shown in connection with 1402 of FIG. 14A. At the review stage, the case-level invoice details 1406 will be displayed for review by the user. In FIG. 14B, a further view of the review stage of the exemplary invoicing component display 1402 is depicted wherein the participant-level invoicing information 1418 is shown for review, along with various invoicing-related actions as appropriate, such as the ability to add previous balances 1420, apply retainers 1422, and include textual memos 1424, discounts 1426 and credits 1428, for instance. In preferred embodiments these fields are customizable between parties, and a party-specific tab is selectable as provided at 1416. During this stage, the display 1402 is also provided with an invoicing action overlay 1412 which may include option to save invoice drafts 1430, go back 1432, save for later 1434 and save and send invoices 1414.

Figure 15:
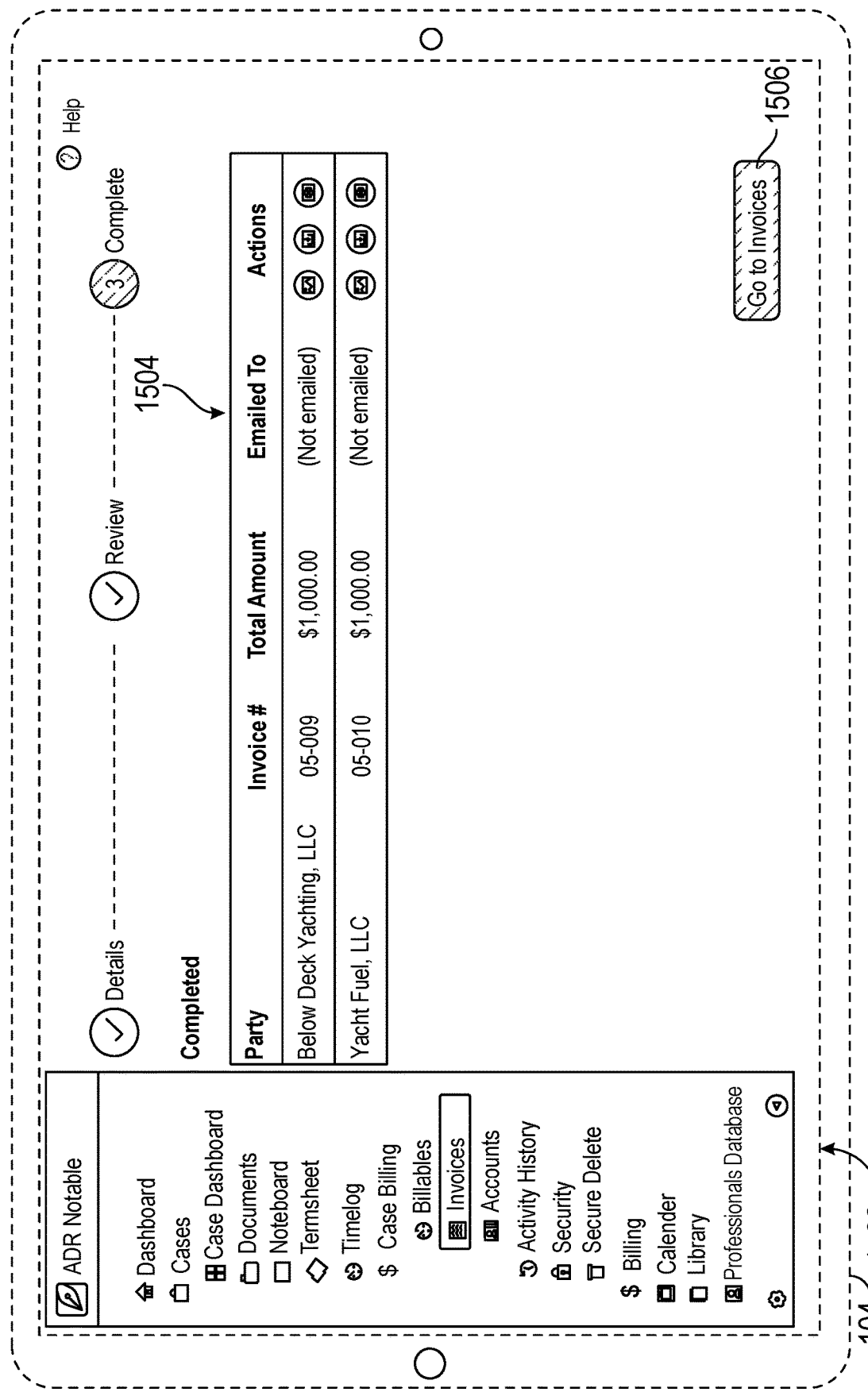
FIG. 15 is a schematic view of an exemplary billing module displayed on a user device.
Figure 17:
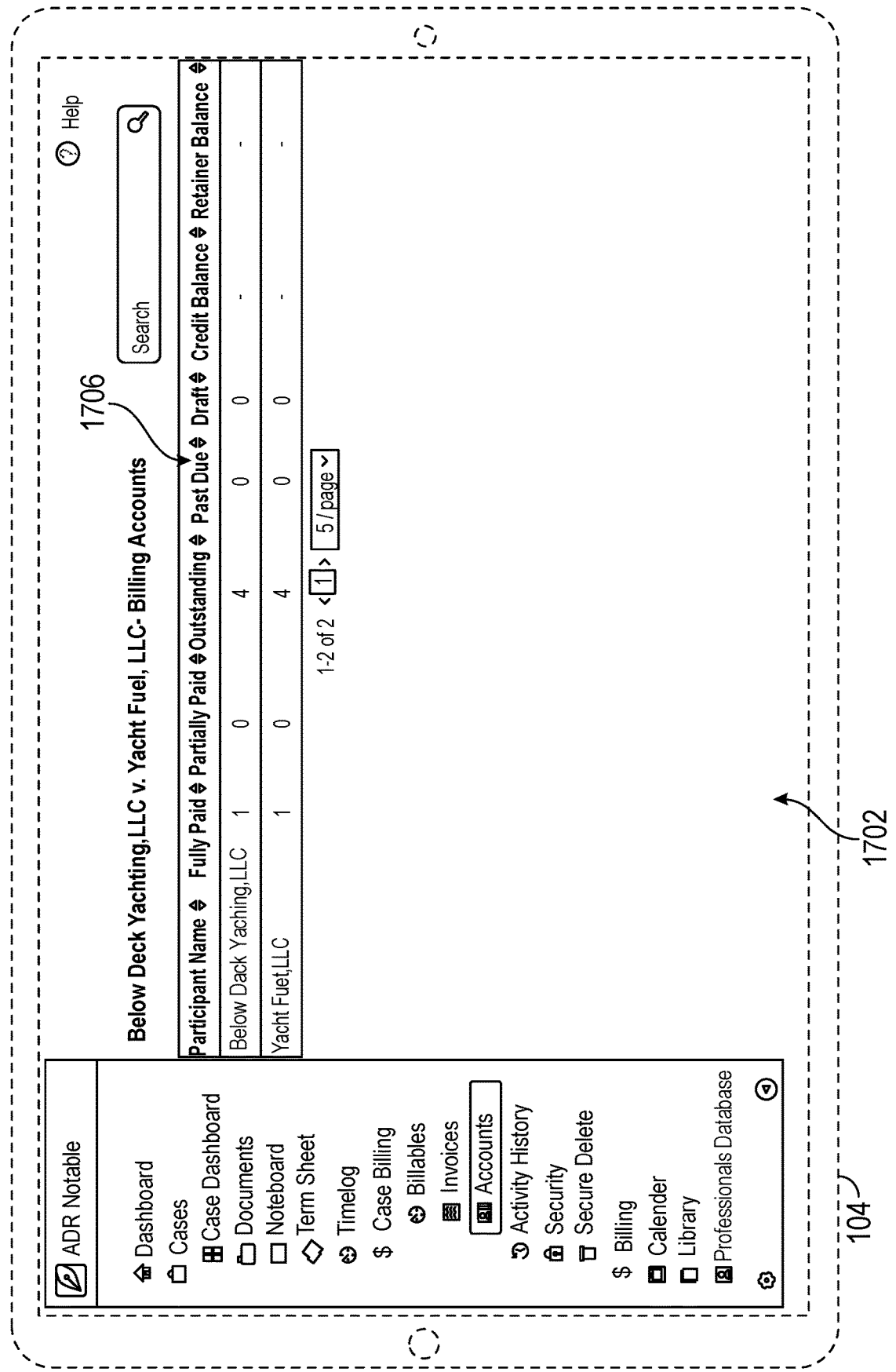
FIG. 17 is a schematic view of an exemplary billing module displayed on a user device.

When the invoicing review stage is complete and button 1414 is selected, the billing module moves to the completed stage of the invoicing process, as illustrated in the exemplary embodiment of the invoicing component display in 1502 shown in connection with FIG. 15. This display embodiment 1502 provides a created invoice table 1504 wherein the invoices that were just created in the previous steps are displayed, along with various optional information such as invoice numbers, amounts, party names, and communication status—e.g., whether or not the invoice has been sent to the party responsible for payment. Several actions may also be provided in this table related to the individual invoices, such as view, download, print or send options. The go to invoices button 1506 in this exemplary embodiment will direct the user and the display to the invoice summary component display as shown at 1602 in connection with FIG. 16, wherein a full invoice summary table 1606 is displayed with invoice information for all invoices related to the case. Relatedly, the accounts component display 1702 will display a full party summary table 1706 with invoice summary information on a responsible party basis, as depicted in the exemplary embodiment of the display 1702 illustrated in connection with FIG. 17.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A computer-implemented method for dynamically linking textual information displayed in a graphical user interface, the method comprising:
   displaying a first swim lane containing a first notecard in a first state comprising first textual information, wherein the first notecard further comprises a proposal acceptance button and a counterproposal button;
   displaying a second swim lane containing a second notecard comprising second textual information;
   displaying in the first swim lane a third notecard comprising third textual information, wherein the third notecard further comprises a proposal acceptance button;
   constantly monitoring the boundaries of the first notecard and the second notecard to detect an overlap condition where the second notecard overlaps the first notecard;

automatically linking the second notecard in a child relationship with the first notecard;

automatically displaying the first notecard in a second state, wherein the first textual information is displayed in a primary content area of the first notecard, and wherein the second textual information of the second notecard is displayed in a nested content area of the first notecard;

receiving an edit to the second textual information of the second notecard wherein the second notecard comprises edited textual information;

automatically displaying the first notecard in a third state, wherein the first textual information is displayed in the primary content area of the first notecard and the edited textual information is displayed in the nested content area of the first notecard;

receiving an actuation signal via the proposal acceptance button of the first notecard;

receiving an actuation signal via the proposal acceptance button of the third notecard; and generating a digital agreement file comprising the first and third textual information.

2. The method of claim 1, wherein the step of generating a digital agreement file comprises the steps of:
displaying on the graphical user interface a term sheet module comprising an agreements clause component having an editable agreements text box;
populating the editable agreements text box with the first and third textual information; and
generating a digital agreement file comprising the first and third textual information.

3. The method of claim 1, wherein the step of generating a digital agreement file comprises the steps of:
displaying on the graphical user interface a term sheet module comprising:
  a preamble clause component having an editable preamble text box and an insert preamble clause button; and
  an agreements clause component having an editable agreements text box;
populating the editable agreements text box with the first and third textual information;
populating the editable preamble text box with a first preamble clause selected from a preamble clause library via the insert preamble clause button; and
generating a digital agreement file comprising:
  the first preamble clause; and
  the first and third textual information.

4. The method of claim 1, wherein the step of generating a digital agreement file comprises the steps of:
displaying on the graphical user interface a term sheet module comprising:
  a preamble clause component having an editable preamble text box and an insert preamble clause button;
  an agreements clause component having an editable agreements text box; and
  a standard terms component having an editable standard terms text box and an insert standard terms button;
populating the editable agreements text box with the first and third textual information;
populating the editable preamble text box with a first preamble clause selected from a preamble clause library via the insert preamble clause button;
populating the editable standard terms text box with a first standard terms clause selected from a standard terms clause library via the insert standard terms button; and generating a digital agreement file comprising:
  the first preamble clause;
  the first and third textual information; and
  the first standard terms clause.

5. The method of claim 1, the method further comprising the steps of:
receiving an actuation signal via the counterproposal button of the first notecard;
displaying on the graphical user interface a counterproposal entry overlay form comprising:
  a counterproposal text entry field; and
  an add button;
receiving a counterproposal text information in the text entry field;
receiving an actuation signal via the add button of the counterproposal entry overlay form;
removing the counterproposal entry overlay form from the graphical user interface;
automatically displaying the first notecard in a fourth state, wherein the counterproposal text information is displayed in the primary content area of the first notecard and the edited textual information is displayed in the nested content area;
receiving an actuation signal via the proposal acceptance button of the first notecard; and
generating a digital agreement file comprising the first and third textual information.

6. The method of claim 5, wherein the step of generating a digital agreement file comprises the steps of:
displaying on the graphical user interface a term sheet module comprising an agreements clause component having an editable agreements text box; populating the editable agreements text box with the first and third textual information; and generating a digital agreement file comprising the first and third textual information.

7. The method of claim 5, wherein the step of generating a digital agreement file comprises the steps of:
displaying on the graphical user interface a term sheet module comprising:
  a preamble clause component having an editable preamble text box and an insert preamble clause button; and
  an agreements clause component having an editable agreements text box;
populating the editable agreements text box with the first and third textual information;
populating the editable preamble text box with a first preamble clause selected from a preamble clause library via the insert preamble clause button; and
generating a digital agreement file comprising:
  the first preamble clause; and
  the first and third textual information.

8. The method of claim 5, wherein the step of generating a digital agreement file comprises the steps of:
displaying on the graphical user interface a term sheet module comprising:
  a preamble clause component having an editable preamble text box and an insert preamble clause button;
  an agreements clause component having an editable agreements text box; and
  a standard terms component having an editable standard terms text box and an insert standard terms button;
populating the editable agreements text box with the first and third textual information;

populating the editable preamble text box with a first preamble clause selected from a preamble clause library via the insert preamble clause button;

populating the editable standard terms text box with a first standard terms clause selected from a standard terms clause library via the insert standard terms button; and generating a digital agreement file comprising:
the first preamble clause;
the first and third textual information; and
the first standard terms clause.

9. A computer-implemented method for dynamically linking textual information displayed in a graphical user interface to facilitate the resolution of a dispute between at least two parties, the method comprising:

displaying a proposal swim lane containing a first notecard in a first state, wherein the first notecard comprises:
first textual information;
a proposal acceptance button; and
a counterproposal button;

displaying a secondary swim lane containing a second notecard comprising second textual information;

constantly monitoring the boundaries of the first notecard and the second notecard to detect an overlap condition where the second notecard overlaps the first notecard;

automatically linking the second notecard in a child relationship with the first notecard;

automatically displaying the first notecard in a second state, wherein the first textual information is displayed in a primary content area of the first notecard, and wherein the second textual information of the second notecard is displayed in a nested content area of the first notecard;

receiving an edit to the second textual information of the second notecard wherein the second notecard comprises edited textual information;

automatically displaying the first notecard in a third state, wherein the first textual information is displayed in the primary content area of the first notecard and the edited textual information is displayed in the nested content area of the first notecard;

receiving an actuation signal via the proposal acceptance button of the first notecard;

displaying a third notecard comprising third textual information in the proposal swim lane, wherein the third notecard further comprises a proposal acceptance button and a counterproposal button;

receiving an actuation signal via the proposal acceptance button of the third notecard; and generating a digital agreement file comprising the first and third textual information.

10. The method of claim 9, wherein the step of generating a digital agreement file comprises the steps of:

displaying on the graphical user interface a term sheet module comprising an agreements clause component having an editable agreements text box;

populating the editable agreements text box with the first and third textual information; and generating a digital agreement file comprising the first and third textual information.

11. The method of claim 9, wherein the step of generating a digital agreement file comprises the steps of:

displaying on the graphical user interface a term sheet module comprising:
a preamble clause component having an editable preamble text box and an insert preamble clause button; and an agreements clause component having an editable agreements text box;

populating the editable agreements text box with the first and third textual information;

populating the editable preamble text box with a first preamble clause selected from a preamble clause library via the insert preamble clause button; and generating a digital agreement file comprising:
the first preamble clause; and
the first and third textual information.

12. The method of claim 9, wherein the step of generating a digital agreement file comprises the steps of:

displaying on the graphical user interface a term sheet module comprising:
a preamble clause component having an editable preamble text box and an insert preamble clause button;
an agreements clause component having an editable agreements text box; and
a standard terms component having an editable standard terms text box and an insert standard terms button;

populating the editable agreements text box with the first and third textual information;

populating the editable preamble text box with a first preamble clause selected from a preamble clause library via the insert preamble clause button;

populating the editable standard terms text box with a first standard terms clause selected from a standard terms clause library via the insert standard terms button; and generating a digital agreement file comprising:
the first preamble clause;
the first and third textual information; and
the first standard terms clause.

13. The method of claim 9, the method further comprising the steps of:

receiving an actuation signal via the counterproposal button of the first notecard;

displaying on the graphical user interface a counterproposal entry overlay form comprising:
a counterproposal text entry field; and
an add button;

receiving a counterproposal text information in the text entry field;

receiving an actuation signal via the add button of the counterproposal entry overlay form;

removing the counterproposal entry overlay form from the graphical user interface;

automatically displaying the first notecard in a fourth state, wherein the counterproposal text information is displayed in the primary content area of the first notecard and the edited textual information is displayed in the nested content area;

receiving an actuation signal via the proposal acceptance button of the first notecard; and generating a digital agreement file comprising the first and third textual information.

14. A computer-implemented method for dynamically linking textual information displayed in a graphical user interface, the method comprising:

displaying a noteboard module on the graphical user interface, wherein the noteboard module comprises:
a notetaking entry component comprising:
a note input field portion; and
a notecard type flag portion; and
a notecard display component;

displaying in the notecard display component a proposal swim lane and a secondary swim lane;

receiving a first input comprising:
- a first textual information received in the note input field portion; and
- a first notecard type flag in the notecard type flag portion, wherein the first notecard type flag is associated with the proposal swim lane;

receiving a second input comprising:
- a second textual information received in the note input field portion; and a second notecard type flag in the notecard type flag portion, wherein the second notecard type flag is associated with the secondary swim lane;

displaying in the proposal swim lane a first notecard in a first state comprising:
- the first textual information;
- a proposal acceptance button; and
- a counterproposal button;

displaying in the secondary swim lane a second notecard in a first state comprising the second textual information;

constantly monitoring the boundaries of the first notecard and the second notecard to detect an overlap condition where the second notecard overlaps the first notecard;

automatically linking the second notecard in a child relationship with the first notecard; automatically displaying the first notecard in a second state, wherein the first textual information is displayed in a primary content area of the first notecard, and wherein the second textual information of the second notecard is displayed in a nested content area of the first notecard;

receiving an edit to the second textual information of the second notecard wherein the second notecard comprises edited textual information;

automatically displaying the first notecard in a third state, wherein the first textual information is displayed in the primary content area of the first notecard and the edited textual information is displayed in the nested content area of the first notecard;

receiving an actuation signal via the proposal acceptance button of the first notecard;

displaying a third notecard comprising third textual information in the proposal swim lane, wherein the third notecard further comprises a proposal acceptance button and a counterproposal button;

receiving an actuation signal via the proposal acceptance button of the third notecard; and generating a digital agreement file comprising the first and third textual information.

15. The method of claim 14, wherein the step of generating a digital agreement file comprises the steps of:
displaying on the graphical user interface a term sheet module comprising an agreements clause component having an editable agreements text box; populating the editable agreements text box with the first and third textual information; and generating a digital agreement file comprising the first and third textual information.

16. The method of claim 14, wherein the step of generating a digital agreement file comprises the steps of:
displaying on the graphical user interface a term sheet module comprising:
- a preamble clause component having an editable preamble text box and an insert preamble clause button;
- an agreements clause component having an editable agreements text box; and
- a standard terms component having an editable standard terms text box and an insert standard terms button;

populating the editable agreements text box with the first and third textual information;

populating the editable preamble text box with a first preamble clause selected from a preamble clause library via the insert preamble clause button;

populating the editable standard terms text box with a first standard terms clause selected from a standard terms clause library via the insert standard terms button; and generating a digital agreement file comprising:
- the first preamble clause;
- the first and third textual information; and
- the first standard terms clause.

17. The method of claim 14, wherein the first notecard further comprises a proposal acceptance button and a counterproposal button, the method further comprising the steps of:
receiving an actuation signal via the counterproposal button of the first notecard;

displaying on the graphical user interface a counterproposal entry overlay form comprising:
- a counterproposal text entry field; and
- an add button;

receiving a counterproposal text information in the text entry field;

receiving an actuation signal via the add button of the counterproposal entry overlay form;

removing the counterproposal entry overlay form from the graphical user interface;

automatically displaying the first notecard in a fourth state, wherein the counterproposal text information is displayed in the primary content area of the first notecard and the edited textual information is displayed in the nested content area;

receiving an actuation signal via the proposal acceptance button of the first notecard; displaying on the graphical user interface a term sheet module comprising an agreements clause component having an editable agreements text box; populating the editable agreements text box with the first and third textual information; and generating a digital agreement file comprising the first and third textual information.

* * * * *